US012710847B1

(12) United States Patent
Tsvetov et al.

(10) Patent No.: US 12,710,847 B1
(45) Date of Patent: Aug. 18, 2026

(54) HEAT-SENSING TOUCH INTERFACE

(71) Applicant: Microsoft Technology Licensing, LLC, Redmond, WA (US)

(72) Inventors: Anatoly Tsvetov, Kfar-Yona (IL); Roei Shlomo Menashof, Netanya (IL); Oren Istrin, Tel-Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 19/090,280

(22) Filed: Mar. 25, 2025

(51) Int. Cl.
*G06F 3/041* (2006.01)

(52) U.S. Cl.
CPC ................................ *G06F 3/04186* (2019.05)

(58) Field of Classification Search
CPC ........ G06N 3/00; G06N 3/006; G06N 3/0464; G06N 3/092; G06N 3/08; G06N 20/00; G06N 7/01; G06N 5/01; G06F 3/04186; G06F 3/041; G06F 3/044
See application file for complete search history.

(56) References Cited

U.S. PATENT DOCUMENTS 8,797,272 B2 * 8/2014 Hsu ....................... G06F 3/0488 345/173
11,899,884 B2 * 2/2024 Park ....................... G06N 20/20
12,254,151 B2 * 3/2025 Lee ....................... G06F 3/0416
2008/0284743 A1 * 11/2008 Hsu ..................... G06F 3/04166 345/173
2010/0245288 A1 9/2010 Harris
2013/0293506 A1 11/2013 El-Khaled
2014/0198064 A1 7/2014 Kim
(Continued)

FOREIGN PATENT DOCUMENTS

CN 105630227 B 9/2018
JP 5765551 B2 8/2015
JP 2024005829 A 1/2024

OTHER PUBLICATIONS

"A new sensor for light, heat and touch", Retrieved From: https://www.sciencedaily.com/releases/2019/05/190514093408.htm, May 14, 2019, 6 Pages.

(Continued)

*Primary Examiner* — Olga V Merkoulova
(74) *Attorney, Agent, or Firm* — Weaver IP L.L.C.

(57) ABSTRACT

A heat-sensing touch interface that profiles the temperature of touch data to identify user input is disclosed herein. Heat profiling touch input improves touch accuracy and allows users to interact with touch devices more naturally. Palm touches can be classified as non-user input, even when appearing as fragmented touches resembling finger touches, when thermal data associated with the palm touchpoint(s) exceeds the temperature range profile for finger touches. Moisture can be classified as non-user input when thermal data associated with the moisture touchpoint(s) is below the temperature range profile for finger touches. The temperature range of user input can be dynamically adjusted. Energy is conserved by activating or sampling a heat sensor array based on detection of touch data. Energy is also conserved by more accurately classifying touch inputs, resulting in reporting and processing fewer non-user inputs. Feedback can be provided at touchpoints classified as user input.

20 Claims, 5 Drawing Sheets

(56) References Cited

U.S. PATENT DOCUMENTS

| | | | | |
|---|---|---|---|---|
| 2014/0306924 | A1 | 10/2014 | Lin | |
| 2015/0324034 | A1 | 11/2015 | Chang | |
| 2015/0331541 | A1* | 11/2015 | Chang | G06F 3/0446 345/174 |
| 2016/0062533 | A1 | 3/2016 | O'Connor | |
| 2017/0052625 | A1 | 2/2017 | Bryant | |
| 2018/0059852 | A1 | 3/2018 | Sterling | |
| 2019/0278388 | A1 | 9/2019 | Barel et al. | |
| 2020/0012382 | A1* | 1/2020 | Lee | G06N 3/00 |
| 2021/0181137 | A1 | 6/2021 | Chowdhury | |
| 2022/0075493 | A1 | 3/2022 | Vankipuram | |
| 2022/0398502 | A1 | 12/2022 | Brito | |
| 2023/0084315 | A1* | 3/2023 | Park | G06F 3/04186 345/174 |
| 2024/0077970 | A1* | 3/2024 | Lee | G06F 3/0488 |

OTHER PUBLICATIONS

"Thermistor time response: what is it and why is it important?", Retrieved From: https://rbr-global.com/thermistor-time-response/, Retrieved on: Jul. 25, 2025, 8 Pages.

Non-Final Office Action mailed on Jan. 21, 2026, in U.S. Appl. No. 19/097,533, 14 Pages.

"How to Change Your Cell Phone's Touch Screen Sensitivity: Apple or Android", CaliCase Team, Retrieved from URL: https://calicase.com/blogs/blog/how-to-change-your-cell-phone-s-touch-screen-sensitivity-apple-or-android?srsltid=AfmBOopWKia7KJ5Ub8g8LWPjZ6-wnkX6u-RHJ_JbSDXQrgUmjavifKtO, Nov. 2, 2023, 7 pages.

* cited by examiner

Heat-Sensing Touch Manager (HSTM) 202
Interface 204
Customizer 206
Adapter 208
Sampler(s) 210
Touch Sampler 222
Thermal Sampler 224
Activator 212
Classifier(s) 214
Reporter 216
Handler 218
Feedback 220

HEAT-SENSING TOUCH INTERFACE

BACKGROUND

Computing devices often utilize touch input devices, such as touchscreens and touchpads, which are touch-sensitive surfaces that allow users to control the computing devices using their fingers. For example, a touchscreen display on a phone, tablet, or notebook computer allows a user to interact with displayed content by touching a display screen or pad. A touchpad is often utilized in portable computers as an integrated mouse but can also be used to provide additional forms of input. A touchpad can have integrated buttons a user can press or click and/or that can be configured to recognize selections based on gestures, such as tapping a finger on the touchpad once to perform a "select" and tap twice to perform an "open" (which mimics the pressing or double-clicking of a button). Other recognized gestures for touchscreens and touchpads include, for example, sliding or dragging a finger to move a cursor, pinching two fingers to zoom in, separating two fingers to zoom out, swiping to scroll, to switch between applications, etc.

Touchscreens and touchpads often include a microcontroller (e.g., a system on a chip (SoC)) configured to process touch input data received by touch sensors. The microcontroller reports the touch inputs to the operating system or application, which generates feedback. For example, the OS or application can generate displayed content showing user input, such as cursor movements, selections, drawings, etc., while the user interacts with displayed content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A heat-sensing touch interface is disclosed herein. Temperature profiling is applied to touch data to improve accuracy in distinguishing between user input and non-user input. Users customize touch and/or temperature profiles for user input, for example, based on accessibility and/or application-specific activities (e.g., word processing, gaming). Dynamic adaptations are provided during touch input, such as temperature range threshold adaptations based on touch inputs and/or based on detected screen and/or ambient temperature. Thermal data is used to filter touch data to eliminate non-user input. Using heat profiles improves touch accuracy performance and allows users to interact with touch devices (e.g., touchscreens and touchpads) more naturally.

In an aspect, a computing device comprises a touch device (e.g., a touchscreen and/or a touchpad) configured with a heat-sensing touch interface. The computing device includes a touch sampler configured to receive touch data from a touch sensor array of the touch device. The touch data indicates at least one touchpoint on the touchscreen. The touchpoint(s) may or may not be user input. The computing device includes a thermal sampler configured to receive thermal data from a thermal sensor array of the touch device. The thermal data is mapped to the at least one touchpoint. The device includes a classifier configured to determine whether to classify the touch data as user input or non-user input based on a touch profile indicated by the touch data and a thermal profile indicated by the thermal data. The device includes a handler to process (e.g., interpret and respond to) the user input.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
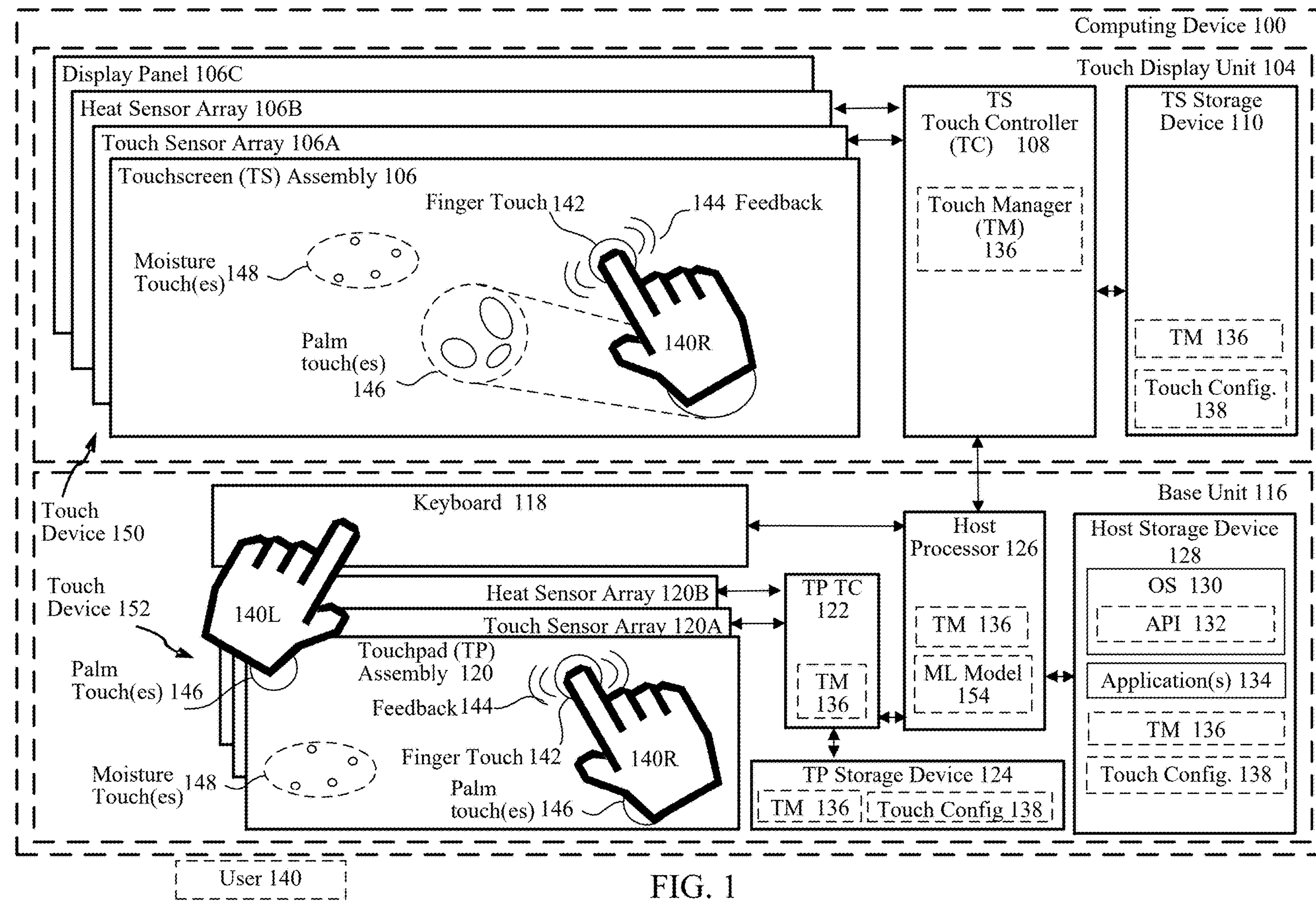
FIG. 1 shows a block diagram of an example computing device with a heat-sensing touch interface, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Computing devices often utilize touch input devices, such as touchscreens and touchpads, which are touch-sensitive surfaces that allow users to control the computing devices using their fingers. For example, a touchscreen display on a phone, tablet, or notebook computer allows a user to interact with displayed content by touching a display screen or pad. A touchpad is often utilized in portable computers as an integrated mouse but can also be used to provide additional forms of input. A touchpad can have integrated buttons a user can press or click and/or that can be configured to recognize selections based on gestures, such as tapping a finger on the touchpad once to perform a "select" and tap twice to perform an "open" (which mimics the pressing or double-clicking of a button). Other recognized gestures for touchscreens and touchpads include, for example, sliding or dragging a finger to move a cursor, pinching two fingers to zoom in, separating two fingers to zoom out, swiping to scroll, to switch between applications, etc.

Touchscreens and touchpads often include a microcontroller (e.g., a system on a chip (SoC)) configured to process touch input data received by touch sensors. The microcontroller reports the touch inputs to the operating system or application, which generates feedback. For example, the OS or application can generate displayed content showing user input, such as cursor movements, selections, drawings, etc., while the user interacts with displayed content.

Touchscreens and touchpads are sometimes unable to distinguish between user input (i.e., intended user input) and non-user input (e.g., unintended input). Non-user input includes moisture (e.g., droplets or water or other liquid) and user palm touches, for example. While a palm touch can be rejected based on a touch input size larger than a finger, palm touches on capacitive touchscreens may show up as multiple smaller touches similar to the size of finger touches, such as due to a loss of grounding and/or based on the shape of the palm and amount of contact at the time of touch. Inaccurate determinations of user input lead to user frustration, user interruption and delay to re-enter user input and/or to correct errant operations based on misinterpretations of user input, as well as excess consumption of energy (e.g., battery depletion) involved in inaccurate reporting and processing of non-user input as if it were intended user input in addition to erroneous operations and undo operations related to inaccurate determinations of user input.

The inventive technology described herein overcomes these and further deficiencies of the art. In particular, a heat-sensing touch interface is disclosed herein. Temperature profiling is applied to touch data to improve accuracy in distinguishing between user input and non-user input. Users are enabled to customize touch and/or temperature profiles for user input, for example, based on accessibility and/or application-specific activities (e.g., word processing, gaming). Dynamic adaptations are provided during touch input, such as temperature range threshold adaptations based on touch inputs and/or based on detected screen and/or ambient temperature. Thermal data is used to filter touch data to eliminate non-user input. Using heat profiles improves touch accuracy performance and allows users to interact with touch devices (e.g., touchscreens and touchpads) more naturally. For example, palm touches can be classified as non-user input, even when appearing as fragmented touches resembling finger touches, when thermal data associated with the palm touchpoint(s) exceeds the temperature range profile for finger touches. Moisture can be classified as non-user input when thermal data associated with the moisture touchpoint(s) is below the temperature range profile for finger touches. Energy can optionally be conserved, for example, by activating a heat sensor array based on detection of touch data while deactivating (not operating) the heat sensor array when touch is not detected. Energy can also be conserved by the more accurate classifying of touch inputs that is herein enabled, resulting in reporting and processing fewer non-user inputs. Feedback (e.g., visual indications) can be provided at touchpoints classified as user input.

In an implementation, a computing device comprises a touch device (e.g., touchscreen and/or touchpad) configured with a heat-sensing touch interface. The device includes a touch sampler configured to receive touch data from a touch sensor array of the touch device. The touch data indicates at least one touchpoint on the touchscreen. The touchpoint(s) may or may not be user input. The device includes a thermal sampler configured to receive thermal data from a thermal sensor array of the touch device. The thermal data is associated with or mapped to the at least one touchpoint. The device includes a classifier configured to determine whether to classify the touch data as user input or non-user input based on a touch profile indicated by the touch data and a thermal profile indicated by the thermal data. The device includes a handler to process (e.g., interpret and respond to) the user input.

Advantages or benefits of the embodiments described further herein include more accurate classification of touch data as user input and more accurate rejection of non-user input (e.g., user palm touch, moisture). Energy is conserved by avoiding reporting and processing non-user input. User experience is improved by improved accuracy is identification of user input. Users can interact with touch devices more naturally without contorting their hands because user-input is identified more accurately and non-user input is rejected more accurately. The temperature differences between fingers, palms, moisture, and touch instruments can be observed and utilized to distinguish between touches regardless of a wide range of ambient and screen temperatures in various environments. The system can be configured for dynamic adaptation and user-customization to maintain accuracy across different users and environments. User accessibility and application-specific interaction (e.g., gaming) is improved by supporting customization of both touch and temperature to more accurately identify customized user inputs for one or more touch devices (e.g., touchscreen, touchpad). In wet environments, capacitive touch interfaces often face challenges due to the conductive properties of water, leading to random or unintended touch inputs. The integration of heat-sensing capabilities addresses this issue by detecting the thermal signatures of touch points instead of relying solely on electrical conductivity. For instance, the above noted thermal sampler receives thermal data from the thermal sensor array that indicates contact points on the touch device surface based on sensed temperature, thereby forming a thermal profile of touch applied to the touch device surface (based on the thermal data) that has the advantage of being based on touch-related temperature rather than capacitive energy of conventional touch surfaces that can erroneously register screen moisture as touch. A thermal profile based on sensed temperature has the advantage of indicating the temperature of moisture related touch points as being of lower temperature than touch points contacted by user skin, thereby enabling the handler in this manner to distinguish them by temperature (e.g., the handler can ignore/reject the lower temperature moisture touch points). Furthermore, palm related touch points are advantageously represented in the thermal profile as having a different temperature (e.g., a greater temperature) than fingertip related touch points, enabling palm touch points to be ignored/rejected by the handler by temperature as well (e.g., the handler can ignore/reject the higher temperature palm touch points). A heat-sensing touch interface used outdoors, in kitchens, medical facilities, industrial facilities, etc. can accurately identify intentional touches even when the touch interface is exposed to moisture.

Embodiments disclosed herein can be configured in various ways. For instance, FIG. 1 shows a block diagram of a computing device 100 with a heat-sensing touch interface, in accordance with an example embodiment. As shown in FIG. 1, computing device 100 includes a touch display unit 104 and a base unit 116. Touch display unit 104 includes a touch device 150, a touchscreen (TS) touch controller (TC) 108, and a TS storage device 110. Touch device 150 includes a touch screen formed at least of a TS assembly 106 that includes a touch sensor array 106A, a heat sensor array 106B, and a display panel 106C. TS touch controller 108 includes a touch manager 136 and TS storage device 110 stores a touch manager 136 and a touch configuration 138. Base unit 116 includes a keyboard 118, a touch device 152, a touchpad (TP) touch controller (TC) 122, a TP storage device 124, a host processor 126, and a host storage device 128. Touch device 152 includes a touchpad formed at least of a touchpad (TP) assembly 120 that includes a touch sensor array 120A and a heat sensor array 120B. TP TC 122 includes a touch manager 136. TP storage device 124 stores a touch manager 136 and a touch configuration 138. Host processor 126 includes a touch manager 136 and a machine learning (ML) model 154. Host storage device 128 stores an operating system 130, one or more applications 134, a touch manager 136, and a touch configuration 138. The components of computing device 100 are described in further detail as follows.

Computing device 100 may be any type of stationary or mobile computing device with a touch input device, including a mobile computer or mobile computing device (e.g., a 2-in-1 device, such as a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server, with at least one touch input device. Example computing device 100 presents one of many possible examples of computing devices. Another example computing device with example features is presented in FIG. 8.

As shown in FIG. 1, computing device 100 (e.g., as shown) may comprise a repositionable notebook computer, a laptop computer, a 2-in-1 computer, a tablet with a case/cover (e.g., with a wired or wireless input device in the case/cover), etc. Computing device 100 includes a touch display unit 104 and a base unit 116. For example, touch display unit 104 (e.g., in an upper/lid portion of computing device 100) and base unit 116 may be physically connected (e.g., by a rotating connector or hinge, a separable connector) and may implement wired communication, or may be physically separate and implement wireless communication (e.g., by a Bluetooth connection). Other computing devices may have the same, similar, or different configuration of touch input devices, with or without other input devices.

Touch display unit 104 includes a touchscreen assembly 106, a touchscreen (TS) touch controller (TC) 108, and a TS storage device 110. Touch display unit 104 may include one or more user input and output devices, such as touchscreen assembly 106. Other examples of computing devices may have the same, similar, and/or other types and configurations of input devices, such as a peripheral touchscreen.

Touchscreen assembly 106 provides a touch input device (e.g., touch and heat sensitive digitizer shown, respectively, as touch sensor array 106A and heat sensor array 106B), an output device, e.g., a display shown as display panel 106C, among other hardware, firmware and/or software components. The touch/heat digitizer ("digitizer") comprises touch and heat sensor element grids or arrays. Touchscreen assembly 106 may occupy any area of touchscreen assembly 106 even though not illustrated as such in FIG. 1. Touchscreen assembly 106 includes touch sensor array 106A, thermal sensor array 106B, and display panel 106C.

In some examples (e.g., as shown in FIG. 1), touchscreen assembly 106 may comprise, from bottom to top, display panel 106C, heat sensor array 106B, touchscreen sensor array 106A, and cover glass that user 140 touches, e.g., with layers of transparent adhesive between the display panel 106C, heat sensor array 106B, touchscreen sensor array 106A, and cover glass. Heat sensor array 106B, touchscreen sensor array 106A, and cover glass may be substantially transparent, or with wires, electrodes, and sensor sufficiently small so as to be unnoticeable to most human vision.

The display panel 106C may be, for example, a liquid crystal display (LCD) or a light emitting diode (LED) display. Display panel 106C may be driven, for example, by a graphics processing unit (GPU) (such as described below with respect to FIG. 7). User 106 interacts with content displayed by display panel 106C, for example, by touching touchscreen assembly 106, which is detected by heat sensor array 106B and touch sensor array 106A. Further example displays applicable to display panel 106C are described in further detail below with respect to FIG. 7.

The touchscreen touch digitizer (e.g., touch sensor array 106A) may comprise any type of touch digitizer, e.g., resistive, capacitive, such as projected capacitance (mutual or self), in-cell, on-cell, out-cell, etc. The touchscreen touch digitizer (e.g., touch sensor array 106A) may be configured to detect touch, for example, via capacitive coupling with an instrument (not shown), a finger, a palm, moisture, etc. in close proximity to touchscreen assembly 106 that results in capacitance at one or more locations of touch sensor array 106A. The detection pitch or resolution of touch sensor array 106A may be, for example, fractional to multiple mm.

Touch sensor(s) in touch sensor array 106A detect locations where a user touches touchscreen assembly 106. Touch sensor(s) may be resistive or capacitive. Resistive touchscreens work similarly to resistive touchpads while capacitive touchscreens work similarly to capacitive touchpads. Touch sensor(s) utilizing resistive technology incorporate two slim layers beneath the outer surface that users touch. The upper layer deflects. User touch causes an electrical connection between the two layers that indicates a touch location. Touch sensor(s) utilizing capacitive technology maintain an electrical charge across touch sensor array 106A. A touch disrupts the charge in the area touched. Locations of connections may be indicated by x, y coordinates on the touch sensor array 106A, which may be mapped to the display panel 106C. Depending on the application 134 or OS 130 that user 140 is interacting with, the user's finger movement across the touch sensor array 106A can be translated on display panel 106C into a selection, a resizing, a drawing, a cursor movement, etc.

Pressure sensor(s) (not shown) may detect the pressure applied during a touch. Pressure sensor(s) may be integrated with touch sensor(s) or may comprise discrete pressure sensors. Different levels of force applied by a user are reflected in the differences between signals (e.g., signal magnitudes) generated by pressure sensor(s).

The touchscreen heat digitizer (e.g., heat sensor array 106B) may comprise any type of heat digitizer. The touchscreen heat digitizer (e.g., heat sensor array 106B) may detect the temperature of an instrument (not shown), a finger, a palm, moisture, etc. in close proximity to touchscreen assembly 106. Heat sensors may be, for example, infrared (IR) sensors or thermopile arrays integrated into TS assembly 106. Heat sensors may be distributed (e.g., evenly) across heat sensor array 106B. For example, the heat digitizer (e.g., heat sensor array 106B) may comprise optically transparent temperature sensors. Sensor materials may be pyroelectric and/or thermoelectric, e.g., a pyroelectric polymer combined with a thermoelectric gel. In some examples, the heat digitizer may comprise a grid or array of transparent nanofilm sensors, such as an Mn—Co—Ni—O (MCN) nanofilm sensors, with transparent electrodes, such as Indium tin oxide (ITO). In some examples, the heat digitizer may include a thermal sensor array printed on a transparent rigid or flexible substrate, such as a flexible 100 μm-thick polyethylene terephthalate (PET) substrate. In some examples, a heat sensor may include a sensor layer comprising poly(3,4-ethylenedioxythiophene):polystyrene sulfonate (PEDOT:PSS) with opposing electrodes. The resolution of heat sensor array 106B may be, for example, 100 sensors per square cm. In some examples, heat sensor array 106B and touch sensor array 106A may be integrated using sensors that are touch and heat sensitive.

Touchscreen (TS) Touch controller (TC) 108 (e.g., a programmed processor executing all or part of TM 136) controls at least the touch/heat digitizer of touchscreen assembly 106 (e.g., touch sensor array 106A and heat sensor array 106B). TS TC 108 is a microcontroller, which is a computer on a chip (e.g., an integrated circuit), including one or more processors, memory, and programmable inputs/outputs (I/O) configured to implement, e.g., among other functions, heat-sensing touch interface, e.g., by executing all or part of TM 136. TS TC 108 may be configured to process touch and/or heat sensor data periodically. For example, TS TC 108 may be configured to process touch and/or heat sensor data every x us or ms to provide a heat-sensing touchscreen interface for user 140.

TS TC 108 may be configured to receive and process touch signals detected by touch sensor array 106A and heat signals detected by heat sensor array 106B. TS TC 108 may process touch data and heat data based on TM 136, which may be configured by touch configuration 138. TS TC 108 may execute all or a portion of TM 136. TS TC 108 may send processed touch signal reports to host processor 126, e.g., for processing relative to OS 130 and/or one or more applications that user 140 may be interacting with via touchscreen assembly 106, e.g., using left hand 140L or right hand 140R.

TS TC 108 may control modes of operation of touchscreen assembly 106. Touchscreen assembly 106 may have a plurality of touch detection and/or heat detection modes, e.g., touch or passive mode, active or pen mode, which may be implemented, at least in part, by TC 108. TC 108 may (e.g., in a touch or passive instrument mode), for example, drive a signal on at least one antenna (e.g., X or Y, row or column, vertical or horizontal portion of a grid) in the touch digitizer portion of touchscreen assembly 106 (e.g., touch sensor array 106A), which may project an electric field over touchscreen assembly 106, and monitor the other antenna/electrode for changes (e.g., caused by a conductive pattern in proximity to touchscreen assembly 106). Signal changes may result in detected signals, each with an associated position and intensity/magnitude. TS TC 108 may (e.g., in an active instrument mode), for example, not drive a signal on an antenna and may (e.g., instead) monitor for (e.g., capacitively coupled) active signals in the touch digitizer portion of touchscreen assembly 106 (e.g., touch sensor array 106A), where each detected signal may have an associated position and intensity/magnitude.

Touchscreen assembly 106 and TS TC 108 may generate positive and negative binary large objects (BLOBs) representative of the area, size, and location of detected touches, which may be accompanied by thermal sensor data associated with the BLOBs. The determination of touch inputs (e.g., and associated thermal data) may be configured, e.g., by a user, and/or dynamically adapted (e.g., by TM 136 executed by TS TC 12 and/or host processor 126). For example, touchscreen assembly 106 and TS TC 108 may detect touch and heat based on one or more (e.g., adaptable and/or configurable) sensitivity (e.g., signal intensity) thresholds (e.g., stored in touch configuration 138). In some examples, TS TC 108 may be configured to report touches (e.g., BLOBs) and associated thermal data to OS 130, e.g., executed by host processor 126. In some examples, TS TC 108 may be configured to process touch data and thermal data to confirm that touch data represents a touch before reporting heat-confirmed touches to OS 130.

TS storage device 110 may store touch manager TM 136 and touch configuration 138 used by TM 136. TS TC 108 may load and execute executable instructions in TM 136, as configured by touch configuration 138. TS storage device 110 may comprise any of one or more types of memory, e.g., non-removable memory, removable memory, random access memory (RAM), read only memory (ROM), flash memory, a solid-state drive (SSD), a hard disk drive (e.g., a disk drive for reading from and writing to a hard disk), and/or other physical memory device types.

In some examples, TM 136 (e.g., executed by TS TC 108) may not activate and/or may not sample heat sensor array 106B until TM 136 samples touch sensor array 106A and processes the samples to determine at least one potential (e.g., intermediate) touch input, which may conserve power (e.g., battery life) in terms of powering down heat sensor array 106B, not sampling heat sensor array 106B, an/or not processing heat sample data unless and until a potential touch input is detected.

Base unit 116 includes a keyboard 118, a touchpad (TP) assembly 120, a TP touch controller (TC) 122, a TP storage device 124, a host processor 126, and a host storage device 128. Base unit 116 may include one or more integrated and/or peripheral user input devices, such as keyboard 118 and touchpad assembly 120. Other examples of computing devices may have the same, similar, and/or other types and configurations of input devices, such as a peripheral touchpad. Note that touchpad and trackpad are used interchangeably herein.

Keyboard 118 is an input device that user 140 can use to provide input to computing device 100. In some examples, one or more keys may be programmed to customize operation of TM 136 (e.g., for a particular application or user) for touch inputs detected by touchscreen assembly 106 and/or touchpad assembly 120.

Touchpad assembly 120 includes a touchpad touch/heat digitizer ("digitizer") (e.g., touch and heat sensor element grids or arrays) among other hardware, firmware, and/or software components. Touchpad assembly 120 provides a touch input device (e.g., touch and heat sensitive digitizer shown as touch sensor array 120A and heat sensor array 120B). Touchpad assembly 120 is an input device that user 140 can use to provide a variety of inputs to computing device 100, such as controlling a cursor, making selections, drawing, zooming in or out, etc. An example touchpad in a notebook computer (e.g., touchpad assembly 120) may be, for example, approximately 90 mm×150 mm (3½ inches×6 inches). In some examples (e.g., as shown in FIG. 1), touchpad assembly 120 may comprise, from bottom to top, heat sensor array 120B, touchscreen sensor array 120A, and cover material that user 140 touches.

The touchpad touch digitizer (e.g., touch sensor array 120A) may comprise any type of touch digitizer, e.g., projected capacitance (mutual or self), in-cell, on-cell, out-cell, etc. The touchpad touch digitizer (e.g., touch sensor array 120A) may be configured to detect touch, for example, via capacitive coupling with an instrument (not shown), a finger, a palm, moisture, etc. in close proximity to touchpad assembly 120 that results in capacitance at one or more locations of touch sensor array 120A. The detection pitch or resolution of touch sensor array 120A may be, for example, fractional to multiple mm.

Touch sensor(s) in touch sensor array 120A detect locations where a user touches touchpad assembly 120. Touch sensor(s) may be resistive or capacitive. Resistive touchpads work similarly to resistive touchscreens while capacitive touchpads work similarly to capacitive touchscreens. Touch sensor(s) utilizing resistive technology incorporate two slim layers beneath the outer surface that users touch. The upper layer deflects. User touch causes an electrical connection between the two layers that indicates a touch location. Touch sensor(s) utilizing capacitive technology maintain an electrical charge across touch sensor array 120A. A touch disrupts the charge in the area touched. Locations of connections may be indicated by x, y coordinates on the touch sensor array 120A, which may be mapped to the display panel 106C. Depending on the application 134 or OS 130 that user 140 is interacting with, the user's finger movement across the touch sensor array 120A can be translated on display panel 106C into a selection, a resizing, a drawing, a cursor movement, etc.

Pressure sensor(s) (not shown) may detect the pressure applied during a touch. Pressure sensor(s) may be integrated with touch sensor(s) or may comprise discrete pressure sensors. Different levels of force applied by a user are reflected in the differences between signals (e.g., signal magnitudes) generated by pressure sensor(s).

The touchpad heat digitizer (e.g., heat sensor array 120B) may comprise any type of heat digitizer. The touchpad heat digitizer (e.g., heat sensor array 120B) may detect the temperature of an instrument (not shown), a finger, a palm, moisture, etc. in close proximity to touchscreen assembly 120. For example, the heat digitizer (e.g., heat sensor array 120B) may comprise pyroelectric and/or thermoelectric sensors, e.g., a pyroelectric polymer combined with a thermoelectric gel. In some examples, the heat digitizer may comprise a grid or array of nanofilm sensors, such as an Mn—Co—Ni—O (MCN) nanofilm sensors, with electrodes, such as Indium tin oxide (ITO). In some examples, the touchpad heat digitizer may include a thermal sensor array printed on a rigid or flexible substrate, such as a flexible 100 μm-thick polyethylene terephthalate (PET) substrate. In some examples, a heat sensor may include a sensor layer comprising poly(3,4-ethylenedioxythiophene):polystyrene sulfonate (PEDOT:PSS) with opposing electrodes. The resolution of heat sensor array 120B may be, for example, 100 sensors per square cm. In some examples, heat sensor array 120B and touch sensor array 120A may be integrated using sensors that are touch and heat sensitive.

Touchpad (TP) Touch controller (TC) 122 (e.g., a programmed processor executing all or part of TM 136) controls at least the touch/heat digitizer of touchpad assembly 120 (e.g., touch sensor array 106A and heat sensor array 106B). TP TC 122 is a microcontroller, which is a computer on a chip (e.g., an integrated circuit), including one or more processors, memory, and programmable inputs/outputs (I/O) configured to implement, e.g., among other functions, heat-sensing touchpad interface, e.g., by executing all or part of TM 136. TP TC 122 may be configured to process touch and/or heat sensor data periodically. For example, TP TC 122 may be configured to process touch and/or heat sensor data every x us or ms to provide a heat-sensing touchpad interface for user 140.

TP TC 122 may be configured to receive and process touch signals detected by touch sensor array 120A and heat signals detected by heat sensor array 120B. TP TC 122 may process touch data and heat data based on TM 136, which may be configured by touch configuration 138. TP TC 122 may execute all or a portion of TM 136. TP TC 122 may send processed touch signal reports to host processor 126, e.g., for processing relative to OS 130 and/or one or more applications that user 140 may be interacting with via touchpad assembly 120, e.g., using left hand 140L or right hand 140R.

TP TC 122 may control modes of operation of touchpad assembly 120. Touchpad assembly 120 may have a plurality of touch detection and/or heat detection modes, e.g., touch or passive mode, active or pen mode, which may be implemented, at least in part, by TP TC 122. TP TC 122 may (e.g., in a touch or passive instrument mode), for example, drive a signal on at least one antenna (e.g., X or Y, row or column, vertical or horizontal portion of a grid) in the touch digitizer portion of touchpad assembly 120 (e.g., touch sensor array 120A), which may project an electric field over touchpad assembly 120, and monitor the other antenna/electrode for changes (e.g., caused by a conductive pattern in proximity to touchpad assembly 120). Signal changes may result in detected signals, each with an associated position and intensity/magnitude. TP TC 120 may (e.g., in an active instrument mode), for example, not drive a signal on an antenna and may (e.g., instead) monitor for (e.g., capacitively coupled) active signals in the touch digitizer portion of touchscreen assembly 120 (e.g., touch sensor array 120A), where each detected signal may have an associated position and intensity/magnitude.

Touchpad assembly 120 and TP TC 122 may generate positive and negative BLOBs representative of the area, size, and location of detected touches, which may be accompanied by thermal sensor data associated with the BLOBs. The determination of touch inputs (e.g., and associated thermal data) may be configured, e.g., by a user, and/or dynamically adapted (e.g., by TM 136 executed by TP TC 122 and/or host processor 126). For example, touchpad assembly 120 and TP TC 122 may detect touch and heat based on one or more (e.g., adaptable and/or configurable) sensitivity (e.g., signal intensity) thresholds (e.g., stored in touch configuration 138). In some examples, TP TC 122 may be configured to report touches (e.g., BLOBs) and associated thermal data to OS 130, e.g., executed by host processor 126. In some examples, TP TC 122 may be configured to process touch data and thermal data to confirm that touch data represents a touch before reporting heat-confirmed touches to OS 130.

TP storage device 124 may store touch manager TM 136 and touch configuration 138 used by TM 136. TP TC 122 may load and execute executable instructions in TM 136, as configured by touch configuration 138. TP storage device 124 may comprise any of one or more types of memory, e.g., non-removable memory, removable memory, random access memory (RAM), read only memory (ROM), flash memory, a solid-state drive (SSD), a hard disk drive (e.g., a disk drive for reading from and writing to a hard disk), and/or other physical memory device types.

Host processor 126 may execute executable instructions in OS 130, application(s) 134, and/or TM 136. Further examples of host processor 126 and host storage device 128 are shown in FIG. 8.

Host storage device 128 may store an operating system (OS) 130, which may include application programming interface (API) 132, application(s) 134, touch manager TM 136, and/or touch configuration 138 used by TM 136. Host storage device 128 may comprise any of one or more types of memory, e.g., non-removable memory, removable memory, random access memory (RAM), read only memory (ROM), flash memory, a solid-state drive (SSD), a hard disk drive (e.g., a disk drive for reading from and writing to a hard disk), and/or other physical memory device types.

Host processor 126 loads and executes OS 130, which provides overall operation of computing device 100. OS 130 may provide a user interface for user 140 to configure operation of TM 136 (e.g., configure touch configuration 138) to process touch/heat inputs detected by TS assembly 106 and/or TP assembly 120. Additional discussion of OS 130 is provided in discussion of FIG. 7 (e.g., OS 712). Processor 126 may load and execute API 132, which can be configured to support dynamically adapted and/or customized operation of heat-sensing touch detection and processing implemented by application(s) 134 and/or TM 136.

Processor 126 loads and executes application(s) 134, for example, in response to user selection of application(s) 134. Application(s) 134 may include, for example, a word processing program, a spreadsheet program, a game, etc., that user 140 can interact with through TS assembly 106 and/or TP assembly 120. Application(s) 134 may provide a user interface for user 140 to configure operation of TM 136 (e.g., configure touch configuration 138) to apply to touch/heat inputs detected by TS assembly 106 and/or TP assembly 120.

Processor 126 may load and execute TM 136, for example, during boot up of computing device 100. TM 136 is configured to provide a heat-sensing touch interface in concert with TS assembly 106 and/or TP assembly 120. In various examples, TM 136 may be implemented in hardware, hardware combined with one or both of software and/or firmware, and/or as program instructions encoded on computer-readable storage media, configured to perform functions and/or operations described herein for a heat-sensing touch interface in association with user interaction with touchscreen assembly 106 and/or touchpad assembly 120. TM 136 may provide a user interface for user 140 to configure operation of TM 136 (e.g., configure touch configuration 138) to apply to touch/heat inputs detected by TS assembly 106 and/or TP assembly 120.

In various examples, application(s) 134, operating system (OS) 130, virtual machines (VMs) (not shown), etc., may be executed, hosted, and/or stored on computing device 100 or via one or more other computing devices via network(s) (e.g., not shown). Computing device 100 (e.g., via TS TC 108, TP TC 122, and/or host processor 126) executes one or more processes. A process is any type of executable (e.g., binary, program, application) that is being executed by computing device 100 (e.g., via TS TC 108, TP TC 122, and/or host processor 126, and/or the like).

As shown in FIG. 1, user 140 interacts with integrated and/or peripheral input and output devices associated with computing device 100. In various examples, the interactive input devices include one or more heat-sensing touch devices, such as TS assembly 106 and TP assembly 120. User interactions include, for example, touching touchscreen assembly 106, typing on keyboard 118, and/or touching touchpad assembly 120. User 140 can provide input, for example, by hand (e.g., touch 132) and/or by input device (e.g., stylus, not shown). User input may be reflected in updates to imagery displayed by display panel 106C.

A user 140, whose hands are represented as a left hand 140L and a right hand 140R, uses touchscreen assembly 106 and touchpad assembly 120 for input in response to imagery shown by display panel 106C in the touchscreen assembly 106 portion of touch display unit 104. As shown on TS assembly 106 and on TP assembly 120, moisture 148 may result in detection of a touch (e.g., a moisture touch 148) by touch sensor array 106A. Moisture touch 148 may occur in a humid environment, such as user 140 walking in the rain using a handheld computing device 100, e.g., a smartphone, or working outside with a notebook computer. Moisture may be detected as one or more droplets smaller than the size of a finger touch or similar to the size of a finger touch. Also shown on TS assembly 106 and TP assembly 120, the user 140 uses the right hand 140R to make a finger touch 142 as an intentional touch and in so doing makes an unintentional palm touch 146. As shown, the palm touch may be detected as multiple touches similar to finger touches rather than as a single large touch more indicative of a palm. The user makes another unintended palm touch on the TP assembly 120 with the left hand 140L while typing on keyboard 118.

As described herein, the heat-sensing user interface implemented by TS assembly 106 and TM 136 and the heat-sensing user interface implemented by TP assembly 120 and TM 136 are configured to accurately identify finger touch 142 as user input and to reject palm touch 146 and moisture touch 148 as non-user input by evaluating the detected touches based on touch data generated by touch sensor array 106A and thermal data generated by heat sensor array 106B and/or based on touch data generated by touch sensor array 120A and thermal data generated by heat sensor array 120B. The heat-sensing user interfaces (e.g., by operation of TM 136) classify a detected touch as user input or non-user input, for example, based on whether the temperature of the detected touch falls within the temperature range of a finger touch or other defined intended touch input, as may be dynamically adjusted and/or user-configured. As shown in FIG. 1, feedback 144 may be provided at locations where touch input was confirmed to be user input based on touch data and heat data. Feedback may be visual, haptic, etc. For example, a visual effect may be displayed by display panel 106C at the location of finger touch 142.

Computing device 100 (e.g., via TS TC 108, TP TC 122, and/or host processor 126) may be configured to execute OS 130, API 132, application(s) 134, and/or touch manager TM 136, for example, to operate a heat-sensing touch interface.

Touch manager TM 136 manages operations performed by the heat-sensing touch interface. TM 136 can be centralized or distributed. Executable versions of TM 136 are shown in dashed lines, e.g., stored in TS storage device 110, TP storage device 124, and/or host storage device 128, and executed in TS TC 108, TP TC 122, and/or host processor 126. The dashed lines indicate that operations performed by TM 136 can be centralized or distributed. For example, powerful microcontrollers TS TC 108 and TP TC 122 may be configured to perform most or all operations of TM 136 while less capable microcontrollers TS TC 108 and TP TC 122 may perform little to no operations of TM 136. Instead, host processor 126 may be configured to perform most or all operations of TM 136. For example, TS TC 108 and/or TP TC 122 may be configured to classify detected touch inputs as user input or non-user input based on touch data and heat data in order to avoid consuming time and energy reporting non-touch inputs to OS 130 executed by host processor 126, thereby reducing the number of reports, while host processor 126 may be configured to interpret the reported touches. For example, TS TC 108 and/or TP TC 122 may be configured to report touch data and heat data to OS 130 and host processor 136 (e.g., or a neural processing unit (NPU), such as NPU 744 in FIG. 7) may be configured to execute the classifier portion of TM 136 as a machine-learning (ML) model configured to classify the touch data and heat data as zero or more user inputs, e.g., with or without classifying/interpreting a meaning of the touch input(s).

Operations of TM 136 can include obtaining, determining, and managing touch configuration 138, which is also shown (e.g., by dashed lines) to be centralized or distributed for storage and utilization in TS storage device 110, TP storage device 124, and/or host storage device 128.

The heat-sensing touch interface (e.g., via TM 136) can be configured to dynamically adjust touch sensitivity of TS assembly 106 and/or TP assembly 120 based on, for example, detected/processed finger, palm, and/or moisture touches, screen temperature, and/or ambient temperature. The dynamic adjustments may be stored, for example, in the prevailing touch configuration 138 applied by TM 136 to evaluate touch data and thermal data.

In some examples, TM 136 (e.g., executed by TS TC 108) may not activate and/or may not sample heat sensor array 106B until TM 136 samples, respectively, touch sensor array 106A and processes the samples to determine at least one potential (e.g., intermediate) touch input, which may conserve power (e.g., battery life) in terms of powering down heat sensor array 106B, not sampling heat sensor array 106B, an/or not processing heat sample data unless and until a potential touch input is detected.

In some examples, TM 136 (e.g., executed by TP TC 122) may not activate and/or may not sample heat sensor array 120B until TM 136 samples, respectively, touch sensor array 120A and processes the samples to determine at least one potential (e.g., intermediate) touch input, which may conserve power (e.g., battery life) in terms of powering down heat sensor array 120B, not sampling heat sensor array 120B, an/or not processing heat sample data unless and until a potential touch input is detected.

Classification of detected touches may be performed in one or more steps/operations. For example, a determination whether to classify touch input data as a user input based on a touch profile indicated by touch input data and a thermal profile indicated by heat sensor data comprises may include a touch-based classifier and a heat-based classifier. The touch-based classifier would be configured to classify the touch input data as intermediate user input or non-user input based on the touch profile. The heat-based classifier is configured to classify the intermediate user input as user input or non-user input based on the heat profile. As described herein, the intermediate user input or non-user input based on the touch and heat profiles can be compared/combined to generate a final characterization of user input or non-user input that is advantageously more accurate than a characterization based on the touch profile-related intermediate user input or non-user input alone. For instance, in an embodiment, the heat-based classifier may function as a filter, e.g., to advantageously filter out non-user input from touch input data. The (e.g., heat-based) classifier may be configured to classify a plurality of fragmented touch inputs as non-touch inputs (e.g., moisture or palm touch/contact points) based on temperature-based clustering (e.g., temperature range uniformity) of the plurality of fragmented touch inputs, e.g., or based on a thermal differential comparing current touchpoint temperatures to temperatures of past or present touch inputs with the differential exceeding a threshold differential.

The classification of the intermediate user input as user input or non-user input based on the heat profile may include, for example, mapping the heat profile to the touch profile; determining a user input temperature threshold/range and a non-user input temperature threshold/range (e.g., non-user input range can be higher temp (palm) and lower temp (moisture)) based on the heat sensor data (e.g., could be single threshold temperature difference between palm and finger and temp difference between finger and moisture); distinguishing touch profiles mapped to heat profiles in the user-input temperature range from touch profiles mapped to heat profiles in the non-user input temperature range; classifying touch profiles mapped to heat profiles in the user-input temperature range as user input; and classifying touch profiles mapped to heat profiles in the non-user input temperature range as non-user input.

The classifier(s) in TM 136 may operate based on touch configuration 138, which may include dynamic adaptations/adjustments and/or user configuration/customization. Touch configuration 138 can include, for example, dynamically adjusted and/or user-configured touch sensitivities, such as a size and/or shape of touch input, upper and/or lower temperature range thresholds for finger touch, palm touch, and/or moisture touch, difference (delta) thresholds between user input (e.g., finger touch) and non-user input (e.g., palm touch or moisture touch), and/or the like. For example, moisture may have the lowest temperature range, finger touch may have a temperature range higher than moisture, and palm touch may have a temperature range higher than finger touch. Touch configuration 138 may include determined or user-entered shapes and sizes for user input and/or for non-user input. While finger touches are usually deemed user input (e.g., intended touch) and palm touches are usually deemed non-user input (e.g., unintentional touch), users may provide user settings via direct input and/or via training that can change the size, shape, temperature, and/or other parameters utilized to detect user input. Users may be motivated to provide user settings/customization to adjust configuration/operation of a heat-sensing user interface, for example, based on accessibility, such as to overcome limitations in hand and/or finger usage, based on application-specific reasons, such as gaming or word processing, and/or based on environment-specific reasons, such as working in a hot, humid environment or a cold, dry environment.

Computing device 100 may include software and/or hardware interfaces for applications and/or users 140 to adapt and/or configure (e.g., customize) operation of the heat-sensing touch interfaces that users 140 interact with via touchscreen assembly 106 and/or touchpad assembly 120. Examples of software interfaces include operating system (OS) application programming interface (API) 132, application(s) 134, and TM 136. API 132 allows a program, such as application(s) 134 and/or TM 136, to determine or accept (e.g., from users 140) touch configuration 138 to adapt or configure operation of TM 136, touchscreen assembly 106, and/or touchpad assembly 120. One or more user interfaces implemented by TM 136, application(s) 134, and/or OS 130 may be configured to allow user 140 to navigate and select/specify/configure user settings for touch-based user input detection for touchscreen assembly 106 and/or touchpad assembly 120. User configuration and/or dynamic adaptation of operating parameters may customize the heat-sensing touch interface, for example, to improve differentiation of touch inputs and non-touch inputs.

OS 130, application(s) 134, and/or TM 136 may, e.g., additionally or alternatively, dynamically adapt touch configuration 138 used by TM 136, for example, based on processing of detected touch inputs (e.g., differentiations between finger, palm, moisture touches), detected ambient temperature, detected screen temperature, etc.

Figures 2, 3, 4:
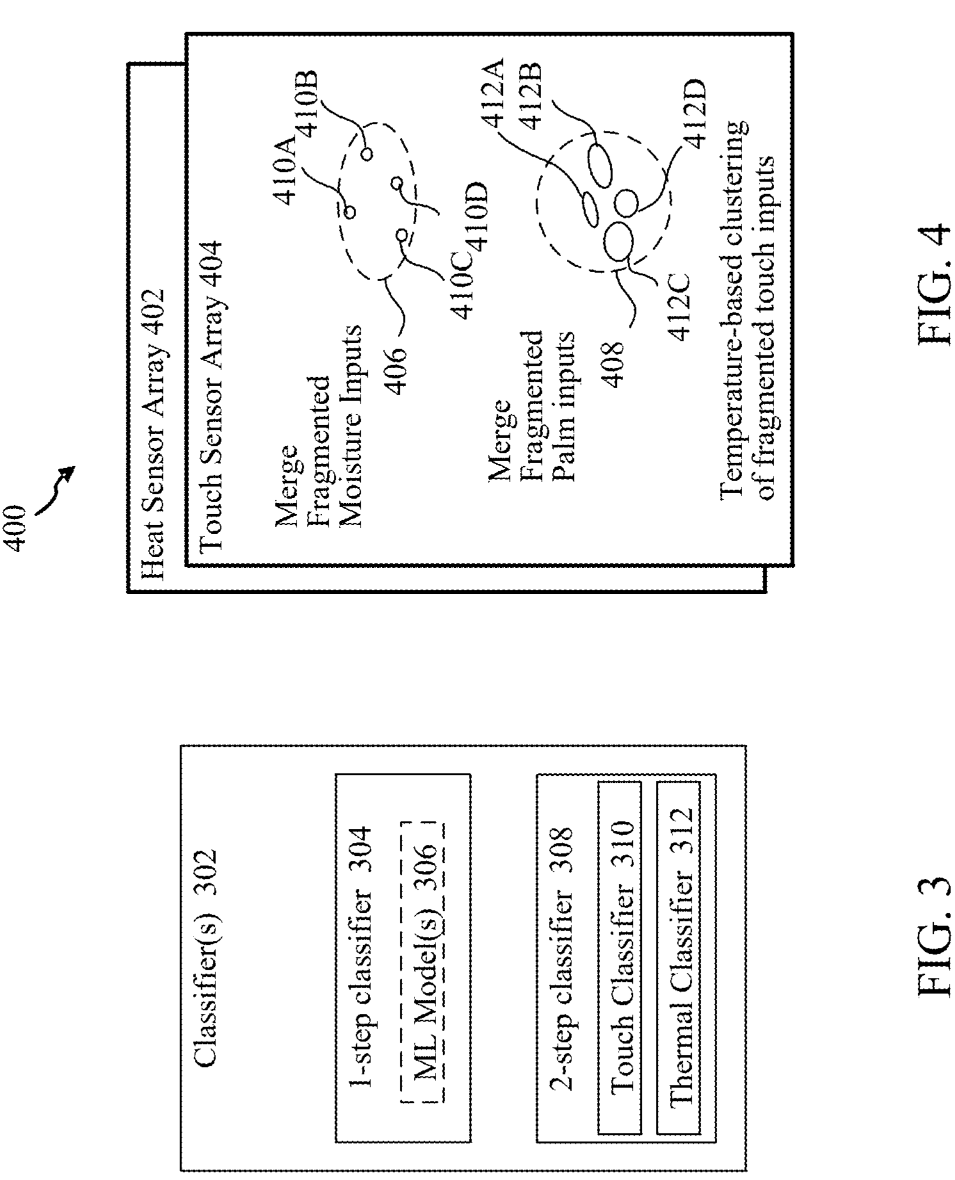
FIG. 2 shows a block diagram of an example touch manager for a heat-sensing touch interface, in accordance with an embodiment.
FIG. 3 shows a block diagram of an example classifier in a heat-sensing touch interface, in accordance with an embodiment.
FIG. 4 shows an example of temperature-based clustering of fragmented touch inputs, in accordance with an embodiment.

Touch manager TM 136 of FIG. 1 may be configured in various ways. For instance, FIG. 2 shows a block diagram of a heat-sensing touch manager (HSTM) 202 for a heat-sensing touch interface, in accordance with an example embodiment. HSTM 202 is an example of TM 136 shown in FIG. 1. HSTM 202 may be implemented in hardware, firmware, and/or executable software, which may be executed with respect to a touchscreen, for example, by TS TC 108 and/or host processor 126 and may be executed with respect to a touchpad, for example, by TP TC 122 and/or host processor 136. HSTM 202 shows one of many possible examples of operational components for a heat-sensing touch interface. Other examples may implement the same or different operational components. As shown in FIG. 2, HSTM 202 includes an interface 204, a customizer 206, an adapter 208, one or more samplers 210, activator 212, one or more classifiers 214, reporter 216, handler 218, and feedback 220. Sampler(s) 210 includes one or more touch samplers 222 and one or more thermal samplers 224. These components of HSTM 202 may be implemented in various ways, including as program code stored in one or more storage devices and executable by one or more processors, electrical circuitry (e.g., logic gates, transistors, one or more integrated circuits, one or more field programable logic gate arrays (FPGAs)), or any combination thereof. Example implementations of HSTM 202 are described in further detail below with respect to FIG. 7. The components of HSTM 202 are described in further detail as follows.

Interface 204 may be configured to access/receive input and access/provide output for operations of HSTM 202. Interface 204 may include one or more different types of interfaces, which may be wired or wireless. For example, interface 204 may read information from and write information to one or more storage devices, such as TS storage device 110, TP storage device 124, and/or host storage device 128. Interface 204 may provide (e.g., send/transmit) reports (e.g., heat-confirmed user input BLOBs or unconfirmed touch BLOBs with heat/thermal data) generated by reporter 216 to OS 130. Interface 204 may receive and store (e.g., buffer) touch data and/or heat/thermal data obtained by sampler(s) 210. Interface 204 may access and provide touch and/or heat data to classifier(s) 214. Interface 204 may access and provide heat-confirmed touch inputs to handler 218 and/or classifier(s) 214 for analysis/determination of user input, e.g., relative to content (e.g., OS 130 and/or application(s) 134) displayed by display panel 106C.

Customizer 206 may be configured to allow user 140 to customize touch and/or temperature profiles for user input, for example, based on accessibility and/or application-specific activities (e.g., word processing, gaming). User 140 may be motivated to provide user settings/customization to adjust configuration/operation of a heat-sensing user interface, for example, based on accessibility, such as to overcome limitations in hand and/or finger usage, based on application-specific reasons, such as gaming or word processing, and/or based on environment-specific reasons, such as working in a hot, humid environment or a cold, dry environment. Customizer 206 can improve user accessibility and application-specific interaction (e.g., gaming) by supporting customization of touch and/or temperature to more accurately identify user inputs for one or more touch devices (e.g., touchscreen, touchpad). Customizer 206 may be configured to allow user 140 to navigate and select/specify/configure user settings for touch-based user input detection for touchscreen assembly 106 and/or touchpad assembly 120. User configuration of operating parameters may customize the heat-sensing touch interface, for example, with an objective to improve differentiation of touch inputs and non-touch inputs by user 140. Customizer 206 may provide a user interface or may utilize an interface provided by interface 204. For example, customizer 206 may permit user 140 to provide user settings via direct input and/or via training that can change the size, shape, temperature, touch time, and/or other parameter(s) utilized by classifier(s) to detect user input and/or distinguish between user input and non-user input. Customizer 206 may recognize one or more keys (e.g., key combinations) programmed to customize operation of HSTM 202 (e.g., for a particular application or user) for touch inputs detected by a touchscreen and/or touchpad. Customizer 204 may store customized settings, for example, in touch configuration 138.

Adapter 208 may be configured to adapt one or more parameters used by classifier(s) to distinguish between user input and non-user input. Adapter 208 may be configured to dynamically adjust one or more parameters, for example, to improve accuracy in differentiation of touch inputs and non-touch inputs. Adapter 208 may adjust parameters, such as size and/or shape thresholds of touch input, upper and/or lower temperature range thresholds for finger touch, palm touch, and/or moisture touch, difference (delta) thresholds between user input (e.g., finger touch) and non-user input (e.g., palm touch or moisture touch), and/or the like. Adjuster 208 may adjust parameters based on, for example, processing of detected touch inputs (e.g., differentiations between finger, palm, moisture touches), detected ambient temperature, detected screen temperature, etc. Adapter 208 may store parameters (e.g., thresholds), for example, in touch configuration 138 for use by classifier(s) 214. In some examples, adapter 208 can be configured to monitor touch temperature profiles to understand a user's interaction patterns. Adapter 208 can, based on the detected interaction patterns, dynamically adjust touch sensitivity to match the user's needs (e.g., provide increased sensitivity for users with detected limited mobility). In some examples, adapter 208 can sense the temperature variations in a user's touch, identifying active and engaged touch points. Adapter 208 can adjust sensitivity for faster, cooler finger touches that may be associated with gaming interaction.

Sampler(s) 210 may include one or more touch samplers 222 and one or more thermal (heat) samplers 224. Sampler (s) 210 may perform sampling of touch sensor array 106A, heat sensor array 106B, touch sensor array 120A, heat sensor array 120B, etc. Sampler(s) 210 may be scheduled to sample (e.g., periodic sampling) or may be ad hoc (e.g., on demand). For example, a touch sampler 222 (e.g., for touch sensor array 106A or touch sensor array 120A) may perform sampling periodically or based on detection of a change in capacitance. A thermal sampler 224 (e.g., for heat sensor array 106B or heat sensor array 120B) may perform sampling based on detection of touch input by touch sampler 222 or based on an analysis or classification (e.g., classification by classifier(s) 214 of the touch input as intermediate/potential user input).

Activator 212 may be configured to activate one or more sensor arrays and/or samplers (e.g., sampler(s) 210). For example, activator may activate heat sensor array (e.g., heat sensor array 106B or heat sensor array 120B) and/or thermal sampler(s) 224 (e.g., sampler(s) 210) in response to detection of touch input by touch sampler 222 or based on an analysis or classification (e.g., classification by classifier(s) 214 of the touch input as intermediate/potential user input). Activator 212 may conserve energy (e.g., battery life) by activating one or more sensor arrays and/or samplers on an as-needed basis. In some examples, activator 212 may be part of or may be associated with a power management unit. One or more power optimization algorithms can be configured to manage power to one or more heat sensor arrays, e.g., to trade off performance, such as sensor activity, processing load and/or touch accuracy, for battery life.

Classifier(s) 214 may be configured to classify touch data from a touch sensor array and thermal data from a heat sensor array. Classifier(s) 214 may include one or more touch data classifiers (e.g., for touch data from a touchpad touch sensor array and touch data from a touchscreen touch sensor array) and one or more thermal/heat data classifiers (e.g., for thermal data from a touchpad heat sensor array and thermal data from a touchscreen heat sensor array). Classifier(s) 214 may be single-step or multi-step. For example, a single-step classifier may classify a detected touch input based on touch data and thermal data in a single step. A machine-learning (ML) model 154 (e.g., executed by host processor 126 or an NPU) may perform such a single-step classification. In some examples, a touch classifier may classify touch data (e.g., a set of touchpoints) as intermediate/potential user input or non-user input, creating a set of potential user inputs, and a thermal classifier may filter the set of potential user inputs to a set of user inputs (e.g., user input touchpoints) by classifying each touchpoint in the set of potential user inputs as user input or non-user input based on heat/thermal data associated with each of the touchpoints.

Reporter 216 may be configured to report information to the host, e.g., OS 130, application(s) 134, or host processor 126. For example, reporter 216 may be configured to report touch BLOBs and thermal data to OS 130 for classification (e.g., by classifier(s) 214). By reporting information to a host, reporter 216 enables the advantage of the host being enabled to act upon determined user touch, and to reject/ignore touch determined to be non-user. For example, reporter 216 may be configured to report touch BLOBs confirmed by classifier(s) 214 to be user input based on thermal data, which may avoid erroneous reports on non-user input and, thereby, conserve energy.

Handler 218 may be configured to interpret the meaning of touch inputs confirmed by classifier(s) 214 to be user input based on touch data and thermal data. Handler 218 may be implemented, for example, by OS 130 and/or application(s) 134. Handler 218 may interpret the meaning of user input based on the OS or application in which the user input was provided and the displayed information at the location of the user input. For example, a user input may be determined to be a selection in a menu or movement of a pointer.

Feedback 220 may be configured to provide feedback to indicate locations where user input was confirmed based on touch data and thermal data. For example (e.g., as shown in FIG. 1), feedback 144 may be provided at locations where touch input was confirmed by classifier(s) 214 to be user input based on touch data and heat data. Feedback may be visual, haptic, etc. For example, a visual effect may be displayed by display panel 106C at the location of finger touch 142 to let the user know that the user input was detected.

FIG. 3 shows a block diagram of one or more classifiers 302 in a heat-sensing touch interface, in accordance with an embodiment. Classifier(s) 302 is an example of classifier(s) 214 of FIG. 2. As shown in FIG. 3, classifier(s) 302 may be fixed or selectable, such as by one or more of OS 130, application(s) 134, user 140, etc., based on one or more criteria, such as performance, different users of a computing device, etc. Classifier(s) 302 provides several of many possible examples, such as a 1-step classifier 304 and a 2-step classifier 308. Classifier(s) 302 is described in further detail as follows.

A single-step classifier (e.g., 1-step classifier 304) of classifier(s) 302 may be configured to classify a touch input based on touch data from a touch sensor array and thermal data from a heat sensor array in a single step. For example, ML model(s) 306 may be executed by host processor 126 or an NPU to perform a single-step classification of a touch input as user input (e.g., intended finger touch, intended palm touch) or non-user input (e.g., unintended palm touch, moisture touch). ML model(s) 306 may be trained on generic touch input and/or (e.g., refined or customized) based on user input (e.g., in a training mode, such as during customization).

In some examples, ML model(s) 306 may be configured to classify and interpret the touch data and heat data as zero or more user inputs with an interpretation of the meaning of the touch input(s), if any. To perform an interpretation, ML model(s) 306 may receive a context of displayed content to determine what content user input touchpoints interact with. Further description of the training and implementation of ML models applicable to ML model(s) 154 (FIG. 1) and 306 is provided elsewhere herein with respect to FIG. 7.

A multi-step touch classifier (e.g., 2-step classifier 308) may include one or multiple classifiers. For example, 2-step classifier 308 may include a touch classifier 310 and a thermal classifier 312. In some examples, touch classifier 310 may be configured to classify touch data (e.g., a set of touchpoints) as intermediate/potential user input or non-user input, creating a set of potential user inputs from the set of touchpoints. Thermal classifier 312 may be configured to filter the set of potential user inputs to a set of user inputs (e.g., user input touchpoints) by classifying each touchpoint in the set of potential user inputs as user input or non-user input based on heat/thermal data associated with each of the touchpoints. A set and a subset may include zero or more members.

FIG. 4 shows a touch device 400, according to an example embodiment. Touch device 400 is an example of touch devices 150 and 152 in FIG. 1. As shown in FIG. 4, touch device 400 includes a heat sensor array 402 and a touch sensor array 404. In embodiments, touch device 400 may include further features not shown in FIG. 4 (e.g., a touch surface, a display panel (e.g., an array of light emitting diodes)). Touch device 400 is configured to perform temperature-based clustering of fragmented touch inputs. As shown in FIG. 4, touch sensor array 404 detects multiple touchpoints in a first cluster 406 (e.g., touchpoints 410A-410D) and in a second cluster 408 (e.g., touchpoints 412A-412D). These fragmented user inputs (e.g., moisture and palm touchpoints) that may otherwise be determined to be independent touchpoints based on touch data alone can be merged based on temperature range uniformity. Fragmented inputs that are user input may be classified as user input while fragmented inputs that are non-user input (e.g., moisture or palm touch/contact points) may be classified as non-touch inputs. For example, as shown in FIG. 4, classifier(s) 302/214 may merge fragmented moisture inputs 406 and/or fragmented palm inputs 408 based on temperature-clustering (e.g., temperature range uniformity) of the inputs. The temperature range uniformity allows a type of heat vision to interpret seemingly separate touch inputs as being part of a common source, which may avoid misclassification, misinterpretation, and conserve resources (e.g., power/battery life, processing time, memory).

Temperature-based clustering may occur, for example, in classifier(s) 214, e.g., prior to interpretation of user input touchpoints by handler 218, which may conserve energy and processing time. For example, a heat-based classifier or a combined touch and heat based classifier may be configured to classify a plurality of fragmented touch inputs based on temperature-based clustering (e.g., temperature range uniformity) of a plurality of fragmented touch inputs, e.g., or based on a thermal differential comparing current touchpoint temperatures to temperatures of past or present touch inputs with the differential exceeding a threshold differential.

Figure 5:
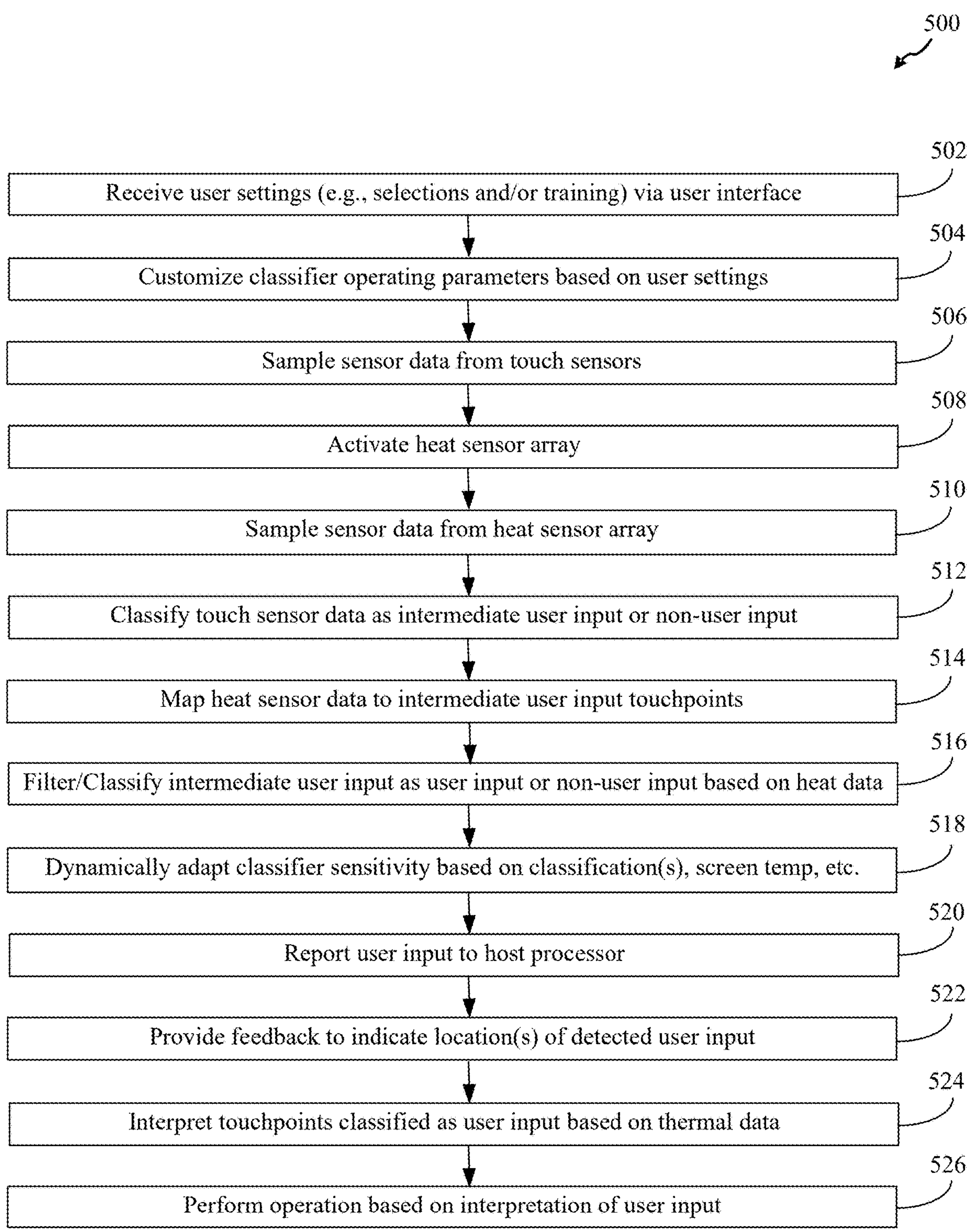
FIG. 5 shows a flowchart of a process for determining whether touchpoints are user inputs based on thermal data, in accordance with an example embodiment.

Embodiments disclosed herein may operate in various ways. For instance, FIG. 5 shows a flowchart 500 of providing a heat-sensing touch interface, in accordance with an embodiment. Embodiments disclosed herein and other embodiments may operate in accordance with examples shown in FIGS. 1-4. Example flowchart 500 shows an example method of providing a heat-sensing touch interface executed by touchscreen assembly 106 (e.g., touch sensor array 106A, heat sensor array 106B, display panel 106C), touchpad assembly 120 (e.g., touch sensor array 120A, heat sensor array 120B), TS TC 108, TP TC 122, TM 136/202, etc. Flowchart 500 comprises steps 502-526. However, other embodiments may operate according to other methods, such as described with respect to FIG. 5. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 5. FIG. 5 is simply one of many possible embodiments. Embodiments may implement fewer, more or different steps.

Flowchart 500 comprises step 502. In step 502, user settings (e.g., selections and/or training) are received via a user interface. For example, as shown in FIGS. 1 and 2, user 140 interacts with a user interface provided by customizer 206 to indicate user settings (e.g., configure operating parameters) for the touchpad and/or touchscreen heat-sensing touch interface to improve differentiation of touch inputs and non-touch inputs.

In step 504, classifier operating parameters may be customized based on user settings. For example, as shown in FIGS. 1 and 2, customizer 206 updates touch configuration 138 to reflect user settings indicated at step 502. TM 136 can be configured to operate based on parameters indicated in touch configuration 138.

In step 506, touch sensor data is sampled. For example, as shown in FIGS. 1 and 2, sampler(s) 210 sample touch data from touch sensor array 106A and/or touch sensor array 120A.

In step 508, the heat sensor array is activated. For example, as shown in FIGS. 1 and 2, activator 212 activates heat sensor array 106B and/or heat sensor array 120B, for example, in response to detection of touch input in the touch sensor data sampled in step 506.

In step 510, heat sensor data is sampled from the activated heat sensor array. For example, as shown in FIGS. 1 and 2, sampler(s) 210 sample heat data from heat sensor array 106B and/or heat sensor array 120B.

In step 512, touch sensor data may be classified as intermediate user input or non-user input. For example, as shown in FIGS. 1-3, touch classifier 310 in 2-step classifier 308 may classify touch data for one or more touchpoints as intermediate user input or non-user input.

In step 514, heat sensor data may be mapped to intermediate user input touchpoints. For example, as shown in FIGS. 1 and 2, sampler(s) 210 may be configured to sample and store (e.g., buffer) heat data sampled for touch data touchpoints in TS storage device 110 or TP storage device 124 with indicators that associate the heat data for a touchpoint with touch data for the same touchpoint.

In step 516, intermediate user input is filtered or classified as user input or non-user input based on heat data. For example, as shown in FIGS. 1-3, thermal classifier 312 in 2-step classifier 308 filters the intermediate user input created by touch classifier 310 based on heat data associated with the touchpoints, resulting in classification of the touchpoints as user input or non-user input.

In step 518, classifier sensitivity is dynamically adapted based on classification(s), screen temp, etc. For example, as shown in FIGS. 1 and 2, adapter 208 dynamically adapts one or more parameters that impact operation of classifier(s) 214 based on sensed temperature ranges of touchpoints classified as user input and/or non-user input, based on scree temperature, ambient temperature, etc. Adapter 208 may update parameters in touch configuration 138 used by classifier(s) 214.

In step 520, user input in reported to host processor. For example, as shown in FIGS. 1 and 2, reporter 216 sends a report to OS 130 executed by host processor 126 comprising one or more BLOBs representing one or more touchpoints. Depending on the division of TM 136/202 between controller and processor, the report may include only BLOBs confirmed to be user input based on heat data or the BLOBs may be accompanied by the heat data for classification by host processor 126.

In step 522, feedback is provided to indicate location(s) of detected user input. For example, as shown in FIGS. 1 and 2, feedback 220 provides feedback 144 at the touchpoint determined to be finger touch 142.

In step 524, touchpoints classified as user input based on thermal data are interpreted. For example, as shown in FIGS. 1 and 2, TM 136, OS 130, and/or application(s) 134 may be configured to interpret the meaning of one or more touchpoints determined to be user input based on touch data and heat data. For example, TM 136, OS 130, and/or application (s) 134 may determine that user 140 intended to select an item in a menu.

In step 526, an operation is performed based on interpretation of user input. For example, as shown in FIGS. 1 and 2, TM 136, OS 130, and/or application(s) 134 may be configured to perform one or more operations based on the meaning of the user input determined at step 524. For example, TM 136, OS 130, and/or application(s) 134 may select the item in the menu, which may result in further action(s).

Figure 6:
FIG. 6 shows a flowchart of a process for determining whether touchpoints are user inputs based on thermal data, according to an example embodiment.
Figure 6:
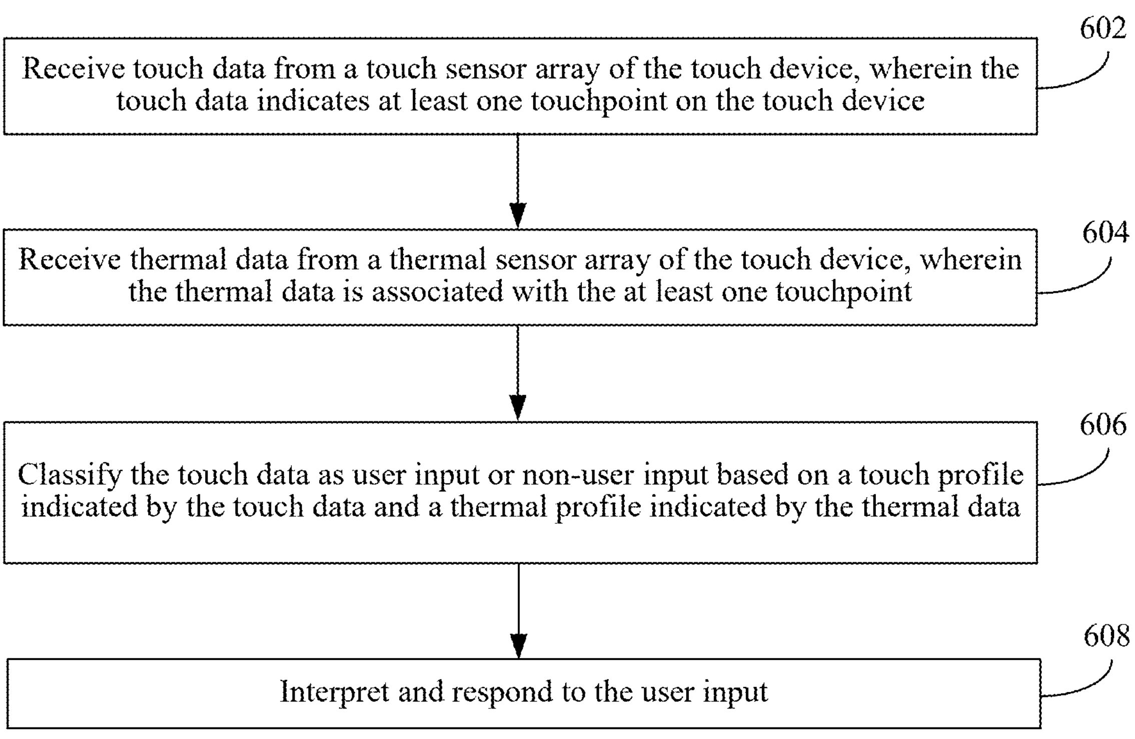

FIG. 6 shows a flowchart 600 of a process for providing a heat-sensing touch interface, in accordance with an embodiment. Embodiments disclosed herein and other embodiments may operate in accordance with examples shown in FIGS. 1-4. Flowchart 600 shows an example method of providing a heat-sensing touch interface executed by touchscreen assembly 106 (e.g., touch sensor array 106A, heat sensor array 106B, display panel 106C), touchpad assembly 120 (e.g., touch sensor array 120A, heat sensor array 120B), TS TC 108, TP TC 122, TM 136/202, etc. The example shown in FIG. 6 includes operations 602-608. There is no requirement that a method embodiment implement all of the steps illustrated in FIG. 6. FIG. 6 is simply one of many possible embodiments. Various embodiments may implement one or more operations shown in FIG. 6 with additional and/or alternative steps. Further structural and operational embodiments will be apparent to persons skilled in the relevant art(s) based on the following description of FIG. 6.

Flowchart 600 comprises step 602. In step 602, touch data is received from a touch sensor array of a touch device. The touch data indicates at least one touchpoint on the touch device. For example, as shown in FIGS. 1 and 2, sampler(s) 210 sample touch data from touch sensor array 106A and/or touch sensor array 120A.

In step 604, thermal data is received from a thermal sensor array of the touch device. The thermal data is associated with the at least one touchpoint. For example, as shown in FIGS. 1 and 2, sampler(s) 210 sample heat data from heat sensor array 106B and/or heat sensor array 120B.

In step 606, the touch data is classified as user input or non-user input based on a touch profile indicated by the touch data and a thermal profile indicated by the thermal data. For example, as shown in FIGS. 1-3, classifier(s) 214, e.g., 304 or 308, determine whether to classify each touchpoint as user input or non-user input based on the received touch data (e.g., indicating a touch profile with a shape, size, and location) and heat data associated with each touchpoint (e.g., indicating a heat profile falling in a temperature range associated with finger touch, palm touch, moisture touch, instrument touch, etc.).

In step 608, the touch data classified as user input is interpreted and responded to. For example, as shown in FIGS. 1 and 2, TM 136, OS 130, and/or application(s) 134 may be configured to interpret the meaning of one or more touchpoints determined to be user input based on touch data and heat data. For example, TM 136, OS 130, and/or application(s) 134 may determine that user 140 intended to select an item in a menu. TM 136, OS 130, and/or application(s) 134 may respond to the interpreted meaning by selecting the item in the menu.

III. Example Computing Device Embodiments

In embodiments, one or more of TS TC 108, TP TC 122, TM 136/202, interface 204, a customizer 206, an adapter 208, sampler(s) 210, activator 212, classifier(s) 214/302, reporter 216, handler 218, and feedback 220, 1-step classifier 304, ML model(s) 306, 2-step classifier 308, touch classifier 310, thermal classifier 312, and flowcharts 500 and 600 are implemented with computer program code/instructions configured to be executed in one or more processors and stored in a computer readable storage medium. Alternatively, in embodiments, one or more of TS TC 108, TP TC 122, TM 136/202, interface 204, a customizer 206, an adapter 208, sampler(s) 210, activator 212, classifier(s) 214/302, reporter 216, handler 218, and feedback 220, 1-step classifier 304, ML model(s) 306, 2-step classifier 308, touch classifier 310, thermal classifier 312, and flowcharts 500 and 600 are implemented in one or more SoCs (system on chip). An SoC includes an integrated circuit chip that includes one or more of a processor (e.g., a central processing unit (CPU), microcontroller, microprocessor, digital signal processor (DSP), etc.), memory, one or more communication interfaces, and/or further circuits, and optionally executes received program code and/or include embedded firmware to perform functions.

Figure 7:
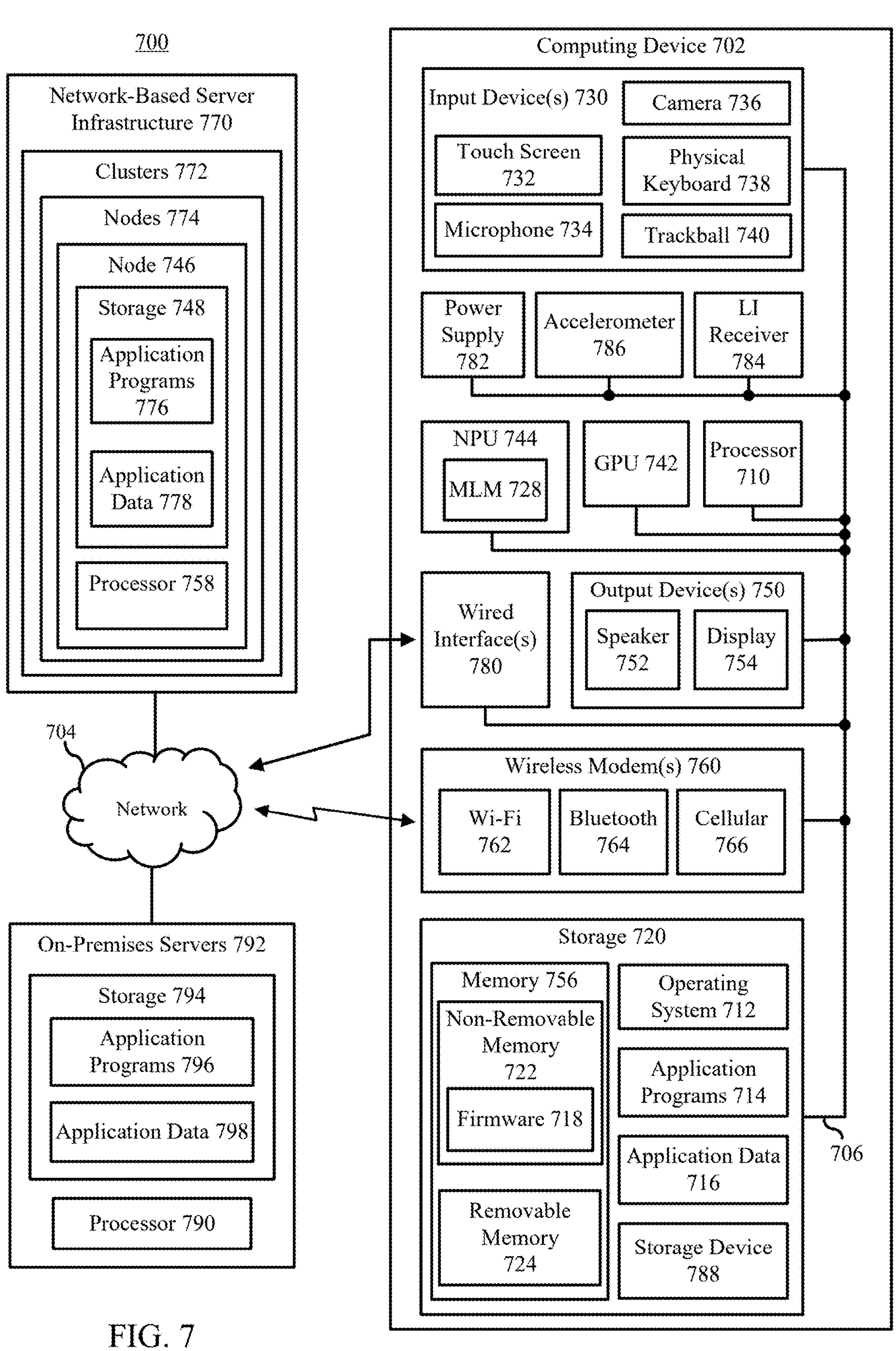
FIG. 7 shows a block diagram of an example computer system in which embodiments may be implemented.

Embodiments disclosed herein can be implemented in one or more computing devices that are mobile (a mobile device) and/or stationary (a stationary device) and include any combination of the features of such mobile and stationary computing devices. Examples of computing devices in which embodiments are implementable are described as follows with respect to FIG. 7. FIG. 7 shows a block diagram of an exemplary computing environment 700 that includes a computing device 702. Computing device 702 is an example of computing device 100, which may include one or more of the components of computing device 702. In some embodiments, computing device 702 is communicatively coupled with devices (not shown in FIG. 7) external to computing environment 700 via network 704. Network 704 comprises one or more networks such as local area networks (LANs), wide area networks (WANs), enterprise networks, the Internet, etc. In examples, network 704 includes one or more wired and/or wireless portions. In some examples, network 704 additionally or alternatively includes a cellular network for cellular communications. Computing device 702 is described in detail as follows.

Computing device 702 is any of a variety of types of computing devices. Examples of computing device 702 include a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. In an alternative example, computing device 702 is a stationary computing device such as a desktop computer, a personal computer (PC), a stationary server device, a minicomputer, a mainframe, a supercomputer, etc.

As shown in FIG. 7, computing device 702 includes a variety of hardware and software components, including a processor 710, a storage 720, a graphics processing unit (GPU) 742, a neural processing unit (NPU) 744, one or more input devices 730, one or more output devices 750, one or more wireless modems 760, one or more wired interfaces 780, a power supply 782, a location information (LI) receiver 784, and an accelerometer 786. Storage 720 includes memory 756, which includes non-removable memory 722 and removable memory 724, and a storage device 788. Storage 720 also stores an operating system 712, application programs 714, and application data 716. Wireless modem(s) 760 include a Wi-Fi modem 762, a Bluetooth modem 764, and a cellular modem 766. Output device(s) 750 includes a speaker 752 and a display 754. Input device (s) 730 includes a touch screen 732, a microphone 734, a camera 736, a physical keyboard 738, and a trackball 740. Not all components of computing device 702 shown in FIG. 7 are present in all embodiments, additional components not shown may be present, and in a particular embodiment any combination of the components are present. In examples, components of computing device 702 are mounted to a circuit card (e.g., a motherboard) of computing device 702, integrated in a housing of computing device 702, or otherwise included in computing device 702. The components of computing device 702 are described as follows.

In embodiments, a single processor 710 (e.g., central processing unit (CPU), microcontroller, a microprocessor, signal processor, ASIC (application specific integrated circuit), and/or other physical hardware processor circuit) or multiple processors 710 are present in computing device 702 for performing such tasks as program execution, signal coding, data processing, input/output processing, power control, and/or other functions. In examples, processor 710 is a single-core or multi-core processor, and each processor core is single-threaded or multithreaded (to provide multiple threads of execution concurrently). Processor 710 is configured to execute program code stored in a computer readable medium, such as program code of operating system 712 and application programs 714 stored in storage 720. The program code is structured to cause processor 710 to perform operations, including the processes/methods disclosed herein. Operating system 712 controls the allocation and usage of the components of computing device 702 and provides support for one or more application programs 714 (also referred to as "applications" or "apps"). In examples, application programs 714 include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. In examples, processor(s) 710 includes one or more general processors (e.g., CPUs) configured with or coupled to one or more hardware accelerators, such as one or more NPUs 744 and/or one or more GPUs 742.

Any component in computing device 702 can communicate with any other component according to function, although not all connections are shown for ease of illustration. For instance, as shown in FIG. 7, bus 706 is a multiple signal line communication medium (e.g., conductive traces in silicon, metal traces along a motherboard, wires, etc.) present to communicatively couple processor 710 to various other components of computing device 702, although in other embodiments, an alternative bus, further buses, and/or one or more individual signal lines is/are present to communicatively couple components. Bus 706 represents one or more of any of several types of bus structures, including a memory bus or memory controller, a peripheral bus, an accelerated graphics port, and a processor or local bus using any of a variety of bus architectures.

Storage 720 is physical storage that includes one or both of memory 756 and storage device 788, which store operating system 712, application programs 714, and application data 716 according to any distribution. Non-removable memory 722 includes one or more of RAM (random access memory), ROM (read only memory), flash memory, a solid-state drive (SSD), a hard disk drive (e.g., a disk drive for reading from and writing to a hard disk), and/or other physical memory device type. In examples, non-removable memory 722 includes main memory and is separate from or fabricated in a same integrated circuit as processor 710. As shown in FIG. 7, non-removable memory 722 stores firmware 718 that is present to provide low-level control of hardware. Examples of firmware 718 include BIOS (Basic Input/Output System, such as on personal computers) and boot firmware (e.g., on smart phones). In examples, removable memory 724 is inserted into a receptacle of or is otherwise coupled to computing device 702 and can be removed by a user from computing device 702. Removable memory 724 can include any suitable removable memory device type, including an SD (Secure Digital) card, a Subscriber Identity Module (SIM) card, which is well known in GSM (Global System for Mobile Communications) communication systems, and/or other removable physical memory device type. In examples, one or more of storage device 788 are present that are internal and/or external to a housing of computing device 702 and are or are not removable. Examples of storage device 788 include a hard disk drive, a SSD, a thumb drive (e.g., a USB (Universal Serial Bus) flash drive), or other physical storage device.

One or more programs are stored in storage 720. Such programs include operating system 712, one or more application programs 714, and other program modules and program data. Examples of such application programs include computer program logic (e.g., computer program code/instructions) for implementing TS TC 108, TP TC 122, TM 136/202, interface 204, a customizer 206, an adapter 208, sampler(s) 210, activator 212, classifier(s) 214/302, reporter 216, handler 218, and feedback 220, 1-step classifier 304, ML model(s) 306, 2-step classifier 308, touch classifier 310, thermal classifier 312, and flowcharts 500 and 600 (and/or any individual operations/steps thereof).

Storage 720 also stores data used and/or generated by operating system 712 and application programs 714 as application data 716. Examples of application data 716 include web pages, text, images, tables, sound files, video data, and other data. In examples, application data 716 is sent to and/or received from one or more network servers or other devices via one or more wired or wireless networks. Storage 720 is used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

In examples, a user enters commands and information into computing device 702 through one or more input devices 730 and receives information from computing device 702 through one or more output devices 750. Input device(s) 730 includes one or more of touch screen 732, microphone 734, camera 736, physical keyboard 738, and/or trackball 740 and output device(s) 750 includes one or more of speaker 752 and display 754. Each of input device(s) 730 and output device(s) 750 are integral to computing device 702 (e.g., built into a housing of computing device 702) or are external to computing device 702 (e.g., communicatively coupled wired or wirelessly to computing device 702 via wired interface(s) 780 and/or wireless modem(s) 760). Further input devices 730 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 754 displays information, as well as operating as touch screen 732 by receiving user commands and/or other information (e.g., by touch, finger gestures, virtual keyboard, etc.) as a user interface. Any number of each type of input device(s) 730 and output device(s) 750 are present, including multiple microphones 734, multiple cameras 736, multiple speakers 752, and/or multiple displays 754.

In embodiments where GPU 742 is present, GPU 742 includes hardware (e.g., one or more integrated circuit chips that implement one or more of processing cores, multiprocessors, compute units, etc.) configured to accelerate computer graphics (two-dimensional (2D) and/or three-dimensional (3D)), perform image processing, and/or execute further parallel processing applications (e.g., training of neural networks, etc.). Examples of GPU 742 perform calculations related to 3D computer graphics, include 2D acceleration and framebuffer capabilities, accelerate memory-intensive work of texture mapping and rendering polygons, accelerate geometric calculations such as the rotation and translation of vertices into different coordinate systems, support programmable shaders that manipulate vertices and textures, perform oversampling and interpolation techniques to reduce aliasing, and/or support very high-precision color spaces.

In examples, NPU 744 (also referred to as an "artificial intelligence (AI) accelerator" or "deep learning processor (DLP)") is a processor or processing unit configured to accelerate artificial intelligence and machine learning applications, such as execution of machine learning (ML) model (MLM) 728. In an example, NPU 744 is configured for a data-driven parallel computing and is highly efficient at processing massive multimedia data such as videos and images and processing data for neural networks. NPU 744 is configured for efficient handling of AI-related tasks, such as speech recognition, background blurring in video calls, photo or video editing processes like object detection, etc.

In embodiments disclosed herein that implement ML models, NPU 744 can be utilized to execute such ML models, of which MLM 728 is an example. For instance, where applicable, MLM 728 is a generative AI model that generates content that is complex, coherent, and/or original. For instance, a generative AI model can create sophisticated sentences, lists, ranges, tables of data, images, essays, and/or the like. An example of a generative AI model is a language model. A language model is a model that estimates the probability of a token or sequence of tokens occurring in a longer sequence of tokens. In this context, a "token" is an atomic unit that the model is training on and making predictions on. Examples of a token include, but are not limited to, a word, a character (e.g., an alphanumeric character, a blank space, a symbol, etc.), a sub-word (e.g., a root word, a prefix, or a suffix). In other types of models (e.g., image based models) a token may represent another kind of atomic unit (e.g., a subset of an image). Examples of language models applicable to embodiments herein include large language models (LLMs), text-to-image AI image generation systems, text-to-video AI generation systems, etc. A large language model (LLM) is a language model that has a high number of model parameters. In examples, an LLM has millions, billions, trillions, or even greater numbers of model parameters. Model parameters of an LLM are the weights and biases the model learns during training. Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks).

In further examples, NPU 744 is used to train MLM 728. To train MLM 728, training data is that includes input features (attributes) and their corresponding output labels/target values (e.g., for supervised learning) is collected. A training algorithm is a computational procedure that is used so that MLM 728 learns from the training data. Examples of training inputs for ML model training include user position, angle, gesture, time of day, location, user crypto, etc. Parameters/weights are internal settings of MLM 728 that are adjusted during training by the training algorithm to reduce a difference between predictions by MLM 728 and actual outcomes (e.g., output labels). In some examples, MLM 728 is set with initial values for the parameters/weights. A loss function measures a dissimilarity between predictions by MLM 728 and the target values, and the parameters/weights of MLM 728 are adjusted to minimize the loss function. The parameters/weights are iteratively adjusted by an optimization technique, such as gradient descent. In this manner, MLM 728 is generated through training by NPU 744 to be used to generate inferences based on received input feature sets for particular applications. MLM 728 is generated as a computer program or other type of algorithm configured to generate an output (e.g., a classification, a prediction/inference) based on received input features and is stored in the form of a file or other data structure.

In examples, such training of MLM 728 by NPU 744 is supervised or unsupervised. According to supervised learning, input objects (e.g., a vector of predictor variables) and a desired output value (e.g., a human-labeled supervisory signal) train MLM 728. The training data is processed, building a function that maps new data on expected output values. Example algorithms usable by NPU 744 to perform supervised training of MLM 728 in particular implementations include support-vector machines, linear regression, logistic regression, Naïve Bayes, linear discriminant analysis, decision trees, K-nearest neighbor algorithm, neural networks, and similarity learning.

In an example of supervised learning where MLM 728 is an LLM, MLM 728 can be trained by exposing the LLM to (e.g., large amounts of) text (e.g., predetermined datasets, books, articles, text-based conversations, webpages, transcriptions, forum entries, and/or any other form of text and/or combinations thereof). In examples, training data is provided from a database, from the Internet, from a system, and/or the like. Furthermore, an LLM can be fine-tuned using Reinforcement Learning with Human Feedback (RLHF), where the LLM is provided the same input twice and provides two different outputs and a user ranks which output is preferred. In this context, the user's ranking is utilized to improve the model. Further still, in example embodiments, an LLM is trained to perform in various styles, e.g., as a completion model (a model that is provided a few words or tokens and generates words or tokens to follow the input), as a conversation model (a model that provides an answer or other type of response to a conversation-style prompt), as a combination of a completion and conversation model, or as another type of LLM model.

According to unsupervised learning, MLM 728 is trained to learn patterns from unlabeled data. For instance, in embodiments where MLM 728 implements unsupervised learning techniques, MLM 728 identifies one or more classifications or clusters to which an input belongs. During a training phase of MLM 728 according to unsupervised learning, MLM 728 tries to mimic the provided training data and uses the error in its mimicked output to correct itself (i.e., correct weights and biases). In further examples, NPU 744 perform unsupervised training of MLM 728 according to one or more alternative techniques, such as Hopfield learning rule, Boltzmann learning rule, Contrastive Divergence, Wake Sleep, Variational Inference, Maximum Likelihood, Maximum A Posteriori, Gibbs Sampling, and backpropagating reconstruction errors or hidden state reparameterizations.

Note that NPU 744 need not necessarily be present in all ML model embodiments. In embodiments where ML models are present, any one or more of processor 710, GPU 742, and/or NPU 744 can be present to train and/or execute MLM 728.

One or more wireless modems 760 can be coupled to antenna(s) (not shown) of computing device 702 and can support two-way communications between processor 710 and devices external to computing device 702 through network 704, as would be understood to persons skilled in the relevant art(s). Wireless modem 760 is shown generically and can include a cellular modem 766 for communicating with one or more cellular networks, such as a GSM network for data and voice communications within a single cellular network, between cellular networks, or between the mobile device and a public switched telephone network (PSTN). In examples, wireless modem 760 also or alternatively includes other radio-based modem types, such as a Bluetooth modem 764 (also referred to as a "Bluetooth device") and/or Wi-Fi modem 762 (also referred to as an "wireless adaptor"). Wi-Fi modem 762 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 764 is configured to communicate with another Bluetooth-capable device according to the Bluetooth short-range wireless technology standard(s) such as IEEE 802.15.1 and/or managed by the Bluetooth Special Interest Group (SIG).

Computing device 702 can further include power supply 782, LI receiver 784, accelerometer 786, and/or one or more wired interfaces 780. Example wired interfaces 780 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 780 of computing device 702 provide for wired connections between computing device 702 and network 704, or between computing device 702 and one or more devices/peripherals when such devices/peripherals are external to computing device 702 (e.g., a pointing device, display 754, speaker 752, camera 736, physical keyboard 738, etc.). Power supply 782 is configured to supply power to each of the components of computing device 702 and receives power from a battery internal to computing device 702, and/or from a power cord plugged into a power port of computing device 702 (e.g., a USB port, an A/C power port). LI receiver 784 is useable for location determination of computing device 702 and in examples includes a satellite navigation receiver such as a Global Positioning System (GPS) receiver and/or includes other type of location determiner configured to determine location of computing device 702 based on received information (e.g., using cell tower triangulation, etc.). Accelerometer 786, when present, is configured to determine an orientation of computing device 702.

Note that the illustrated components of computing device 702 are not required or all-inclusive, and fewer or greater numbers of components can be present as would be recognized by one skilled in the art. In examples, computing device 702 includes one or more of a gyroscope, barometer, proximity sensor, ambient light sensor, digital compass, etc. In an example, processor 710 and memory 756 are co-located in a same semiconductor device package, such as being included together in an integrated circuit chip, FPGA, or system-on-chip (SOC), optionally along with further components of computing device 702.

In embodiments, computing device 702 is configured to implement any of the above-described features of flowcharts herein. Computer program logic for performing any of the operations, steps, and/or functions described herein is stored in storage 720 and executed by processor 710.

In some embodiments, server infrastructure 770 is present in computing environment 700 and is communicatively coupled with computing device 702 via network 704. Server infrastructure 770, when present, is a network-accessible server set (e.g., a cloud-based environment or platform). As shown in FIG. 7, server infrastructure 770 includes clusters 772. Each of clusters 772 comprises a group of one or more compute nodes and/or a group of one or more storage nodes. For example, as shown in FIG. 7, cluster 772 includes nodes 774. Each of nodes 774 are accessible via network 704 (e.g., in a "cloud-based" embodiment) to build, deploy, and manage applications and services. In examples, any of nodes 774 is a storage node that comprises a plurality of physical storage disks, SSDs, and/or other physical storage devices that are accessible via network 704 and are configured to store data associated with the applications and services managed by nodes 774.

Each of nodes 774, as a compute node, comprises one or more server computers, server systems, and/or computing devices. For instance, a node 774 in accordance with an embodiment includes one or more of the components of computing device 702 disclosed herein. Each of nodes 774 is configured to execute one or more software applications (or "applications") and/or services and/or manage hardware resources (e.g., processors, memory, etc.), which are utilized by users (e.g., customers) of the network-accessible server set. In examples, as shown in FIG. 7, nodes 774 includes a node 746 that includes storage 748 and/or one or more of a processor 758 (e.g., similar to processor 710, GPU 742, and/or NPU 744 of computing device 702). Storage 748 stores application programs 776 and application data 778. Processor(s) 758 operates application programs 776 which access and/or generate related application data 778. In an implementation, nodes such as node 746 of nodes 774 operate or comprise one or more virtual machines, with each virtual machine emulating a system architecture (e.g., an operating system), in an isolated manner, upon which applications such as application programs 776 are executed.

In embodiments, one or more of clusters 772 are located/co-located (e.g., housed in one or more nearby buildings with associated components such as backup power supplies, redundant data communications, environmental controls, etc.) to form a datacenter, or are arranged in other manners. Accordingly, in an embodiment, one or more of clusters 772 are included in a datacenter in a distributed collection of datacenters. In embodiments, exemplary computing environment 700 comprises part of a cloud-based platform.

In an embodiment, computing device 702 accesses application programs 776 for execution in any manner, such as by a client application and/or a browser at computing device 702.

In an example, for purposes of network (e.g., cloud) backup and data security, computing device 702 additionally and/or alternatively synchronizes copies of application programs 714 and/or application data 716 to be stored at network-based server infrastructure 770 as application programs 776 and/or application data 778. In examples, operating system 712 and/or application programs 714 include a file hosting service client configured to synchronize applications and/or data stored in storage 720 at network-based server infrastructure 770.

In some embodiments, on-premises servers 792 are present in computing environment 700 and are communicatively coupled with computing device 702 via network 704. On-premises servers 792, when present, are hosted within an organization's infrastructure and, in many cases, physically onsite of a facility of that organization. On-premises servers 792 are controlled, administered, and maintained by IT (Information Technology) personnel of the organization or an IT partner to the organization. Application data 798 can be shared by on-premises servers 792 between computing devices of the organization, including computing device 702 (when part of an organization) through a local network of the organization, and/or through further networks accessible to the organization (including the Internet). Furthermore, in examples, on-premises servers 792 serve applications such as application programs 796 to the computing devices of the organization, including computing device 702. Accordingly, in examples, on-premises servers 792 include storage 794 (which includes one or more physical storage devices such as storage disks and/or SSDs) for storage of application programs 796 and application data 798 and include a processor 790 (e.g., similar to processor 710, GPU 742, and/or NPU 744 of computing device 702) for execution of application programs 796. In some embodiments, multiple processors 790 are present for execution of application programs 796 and/or for other purposes. In further examples, computing device 702 is configured to synchronize copies of application programs 714 and/or application data 716 for backup storage at on-premises servers 792 as application programs 796 and/or application data 798.

Embodiments described herein may be implemented in one or more of computing device 702, network-based server infrastructure 770, and on-premises servers 792. For example, in some embodiments, computing device 702 is used to implement systems, clients, or devices, or components/subcomponents thereof, disclosed elsewhere herein. In other embodiments, a combination of computing device 702, network-based server infrastructure 770, and/or on-premises servers 792 is used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 720. Such computer-readable media and/or storage media are distinguished from and non-overlapping with communication media, propagating signals, and signals per se. Stated differently, "computer program medium," "computer-readable medium," "computer-readable storage medium," and "computer-readable storage device" do not encompass communication media, propagating signals, and signals per se. Communication media embodies computer-readable instructions, data structures, program modules, or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 714) are stored in storage 720. Such computer programs can also be received via wired interface(s) 760 and/or wireless modem(s) 760 over network 704. Such computer programs, when executed or loaded by an application, enable computing device 702 to implement features of embodiments discussed herein. Accordingly, such computer programs represent controllers of the computing device 702.

Embodiments are also directed to computer program products comprising computer code or instructions stored on any computer-readable medium or computer-readable storage medium. Such computer program products include the physical storage of storage 720 as well as further physical storage types.

IV. Additional Example Embodiments

Embodiments described herein enable a heat-sensing touch interface. Temperature profiling is applied to touch data to improve accuracy in distinguishing between user input and non-user input. Users can customize touch and/or temperature profiles for user input, for example, based on accessibility and/or application-specific activities (e.g., word processing, gaming). Dynamic adaptations are provided during touch input, such as temperature range threshold adaptations based on touch inputs and/or based on detected screen and/or ambient temperature. Thermal data can filter touch data to eliminate non-user input. Using heat profiles improves touch accuracy performance and allows users to interact with touch devices (e.g., touchscreens and touchpads) more naturally. For example, palm touches can be classified as non-user input, even when appearing as fragmented touches resembling finger touches, when thermal data associated with the palm touchpoint(s) exceeds the temperature range profile for finger touches. Moisture can be classified as non-user input when thermal data associated with the moisture touchpoint(s) is below the temperature range profile for finger touches. Energy can be conserved, for example, by activating a heat sensor array based on detection of touch data. Energy can also be conserved by more accurately classifying touch inputs, resulting in reporting and processing fewer non-user inputs. Feedback (e.g., visual indications) can be provided at touchpoints classified as user input.

In some examples, a computing device comprises a touch device (e.g., touchscreen and/or touchpad) configured with a heat-sensing touch interface. The device includes a touch sampler configured to receive touch data from a touch sensor array of the touch device. The touch data indicates at least one touchpoint on the touchscreen. The touchpoint(s) may or may not be user input. The device includes a thermal sampler configured to receive thermal data from a thermal sensor array of the touch device. The thermal data is associated with or mapped to the at least one touchpoint. The device includes a classifier configured to determine whether to classify the touch data as user input or non-user input based on a touch profile indicated by the touch data and a thermal profile indicated by the thermal data. The device includes a handler to process (e.g., interprets and responds to) the user input.

In some examples, the computing device further comprises a reporter configured to report the touch data classified as user input to a host processor associated with the touch device; or report the touch data and the thermal data to a host processor associated with the touch device.

In some examples, the thermal sampler is configured to sample the heat sensor array and receive the heat sensor data responsive to the touch sampler receiving the touch data.

In some examples, the computing device further comprises an activator configured to activate the heat sensor array responsive to the touch sampler receiving the touch data.

In some examples, the classifier comprises a touch classifier configured to classify the touch data as intermediate user input or non-user input based on the touch profile; and a thermal classifier configured to classify the intermediate user input as user input or non-user input based on the heat profile.

In some examples, the computing device further comprises an adapter configured to dynamically adjust at least one of the touch profile or the thermal profile indicative of user input.

In some examples, the classifier comprises a machine learning model.

In some examples, the computing device further comprises a customizer configured to allow a user to customize at least one of the touch profile or the thermal profile indicative of user input.

Methods are described herein. In some examples, a method comprises receiving touch data from a touch sensor array of the touch device, wherein the touch data indicates at least one touchpoint on the touch device; receiving thermal data from a thermal sensor array of the touch device, wherein the thermal data is associated with the at least one touchpoint; classifying the touch data as user input or non-user input based on a touch profile indicated by the touch data and a thermal profile indicated by the thermal data; and interpreting and responding to the user input.

In some examples, the method further comprises reporting the touch data classified as user input to a host processor associated with the touch device; or reporting the touch data and the thermal data to a host processor associated with the touch device.

In some examples, the method further comprises sampling or activating and sampling the heat sensor array, to receive the heat sensor data, responsive to the touch sampler receiving the touch data.

In some examples, the classifying comprises classifying the touch data as intermediate user input or non-user input based on the touch profile; and classifying the intermediate user input as user input or non-user input based on the heat profile.

In some examples, the method further comprises dynamically adjusting at least one of the touch profile or the thermal profile indicative of user input.

In some examples, the method further comprises providing the touch data and thermal data to a machine-learning model that performs the classification.

In some examples, the method further comprises receiving at least one of a user-customization of the touch profile indicative of user input or a user-customization of the thermal profile indicative of user input.

A computer-readable storage medium is described herein. The computer-readable storage medium has computer program logic recorded thereon that, executed by a processor circuit, causes the processor circuit to perform a method. The method may comprise, for example, any combination of operations described herein.

For example, the method may comprise receiving touch data from a touch sensor array of the touch device, wherein the touch data indicates at least one touchpoint on the touch device; receiving thermal data from a thermal sensor array of the touch device, wherein the thermal data is associated with the at least one touchpoint; classifying the touch data as user input or non-user input based on a touch profile indicated by the touch data and a thermal profile indicated by the thermal data; and interpreting and responding to the user input.

In some examples, the method may further comprise sampling or activating and sampling the heat sensor array, to receive the heat sensor data, responsive to the touch sampler receiving the touch data.

In some examples, the classifying comprises classifying the touch data as intermediate user input or non-user input based on the touch profile; and classifying the intermediate user input as user input or non-user input based on the heat profile.

In some examples, the method may further comprise dynamically adjusting at least one of the touch profile or the thermal profile indicative of user input.

In some examples, the method may further comprise receiving at least one of a user-customization of the touch profile indicative of user input or a user-customization of the thermal profile indicative of user input.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Moreover, according to the described embodiments and techniques, any components of systems, computing devices, servers, device management services, virtual machine provisioners, applications, and/or data stores and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (e.g., or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (e.g., computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A computing device that includes a touch device, the computing device comprising:

a touch sampler configured to receive touch data from a touch sensor array of the touch device, wherein the touch data indicates a plurality of touchpoints on the touch device;

a thermal sampler configured to receive thermal data from a thermal sensor array of the touch device, the thermal sensor array including a plurality of heat sensors that detect a plurality of heat signals across the thermal sensor array as the thermal data, wherein the thermal data is associated with the touchpoints;

a classifier configured to perform temperature-based clustering of the touchpoints to generate clustered touch data, and to classify the clustered touch data as user input or non-user input based on a touch profile indicated by the clustered touch data and a thermal profile indicated by the thermal data; and a handler configured to interpret and respond to the user input.

2. The computing device of claim 1, further comprising:

a reporter configured to:

report the clustered touch data classified as user input to a host processor associated with the touch device; or report the clustered touch data and the thermal data to a host processor associated with the touch device.

3. The computing device of claim 1, wherein the thermal sampler is configured to sample the heat sensor array and receive the heat sensor data responsive to the touch sampler receiving the touch data.

4. The computing device of claim 1, further comprising:

an activator configured to activate the heat sensor array responsive to the touch sampler receiving the touch data.

5. The computing device of claim 1, wherein the classifier comprises:

a touch classifier configured to classify the clustered touch data as intermediate user input or non-user input based on the touch profile; and a thermal classifier configured to classify the intermediate user input as user input or non-user input based on the heat profile.

6. The computing device of claim 1, further comprising:

an adapter configured to dynamically adjust at least one of the touch profile or the thermal profile indicative of user input.

7. The computing device of claim 1, wherein the classifier comprises a machine learning model.

8. The computing device of claim 1, further comprising:

a customizer configured to allow a user to customize at least one of the touch profile or the thermal profile indicative of user input.

9. A method, comprising:

receiving touch data from a touch sensor array of the touch device, wherein the touch data indicates a plurality of touchpoints on the touch device;

receiving thermal data from a thermal sensor array of the touch device, wherein the thermal data is associated with the touchpoints, the thermal sensor array including a plurality of heat sensors that detect a plurality of heat signals across the thermal sensor array as the thermal data;

performing temperature-based clustering of the touchpoints to generate clustered touch data;

classifying the clustered touch data as user input or non-user input based on a touch profile indicated by the clustered touch data and a thermal profile indicated by the thermal data; and interpreting and responding to the user input.

10. The method of claim 9, further comprising:

reporting the clustered touch data classified as user input to a host processor associated with the touch device; or reporting the clustered touch data and the thermal data to a host processor associated with the touch device.

11. The method of claim 9, further comprising:

sampling or activating and sampling the heat sensor array, to receive the heat sensor data, responsive to the touch sampler receiving the touch data.

12. The method of claim 9, wherein the classifying comprises:

classifying the clustered touch data as intermediate user input or non-user input based on the touch profile; and classifying the intermediate user input as user input or non-user input based on the heat profile.

13. The method of claim 9, further comprising:

dynamically adjusting at least one of the touch profile or the thermal profile indicative of user input.

14. The method of claim 9, further comprising:

providing the clustered touch data and thermal data to a machine-learning model that performs the classification.

15. The method of claim 9, further comprising:

receiving at least one of a user-customization of the touch profile indicative of user input or a user-customization of the thermal profile indicative of user input.

16. A computer-readable storage medium having program instructions recorded thereon that, when executed by a processing circuit, perform a method comprising:

receiving touch data from a touch sensor array of the touch device, wherein the touch data indicates a plurality of touchpoints on the touch device;

receiving thermal data from a thermal sensor array of the touch device, wherein the thermal data is associated with the touchpoints, the thermal sensor array including a plurality of heat sensors that detect a plurality of heat signals across the thermal sensor array as the thermal data;

performing temperature-based clustering of the touchpoints to generate clustered touch data;

classifying the clustered touch data as user input or non-user input based on a touch profile indicated by the clustered touch data and a thermal profile indicated by the thermal data; and interpreting and responding to the user input.

17. The computer-readable storage medium of claim 16, the method further comprising:

sampling or activating and sampling the heat sensor array, to receive the heat sensor data, responsive to the touch sampler receiving the touch data.

18. The computer-readable storage medium of claim 16, wherein the classifying comprises:

classifying the clustered touch data as intermediate user input or non-user input based on the touch profile; and classifying the intermediate user input as user input or non-user input based on the heat profile.

19. The computer-readable storage medium of claim 16, the method further comprising:

dynamically adjusting at least one of the touch profile or the thermal profile indicative of user input.

20. The computer-readable storage medium of claim 16, the method further comprising:

receiving at least one of a user-customization of the touch profile indicative of user input or a user-customization of the thermal profile indicative of user input.

* * * * *